(12) United States Patent
Omino et al.

(10) Patent No.: US 12,039,076 B2
(45) Date of Patent: Jul. 16, 2024

(54) DATA MANAGEMENT METHOD, NON-TRANSITORY COMPUTER READABLE MEDIUM, AND DATA MANAGEMENT SYSTEM

(71) Applicant: KABUSHIKI KAISHA TOSHIBA, Tokyo (JP)

(72) Inventors: Tsukasa Omino, Tokyo (JP); Tomoko Yonemura, Kawasaki Kanagawa (JP); Yoshikazu Hanatani, Tokyo (JP); Taihei Yamaguchi, Chigasaki Kanagawa (JP); Misaki Komatsu, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 180 days.

(21) Appl. No.: 17/469,612

(22) Filed: Sep. 8, 2021

(65) Prior Publication Data

US 2022/0147651 A1    May 12, 2022

(30) Foreign Application Priority Data

Nov. 6, 2020    (JP) .................................. 2020-186046

(51) Int. Cl.
*H04L 29/06* (2006.01)
*G06F 21/31* (2013.01)
*G06F 21/62* (2013.01)

(52) U.S. Cl.
CPC .......... *G06F 21/6245* (2013.01); *G06F 21/31* (2013.01); *G06F 2221/2113* (2013.01); *G06F 2221/2141* (2013.01)

(58) Field of Classification Search
CPC ............................ G06F 21/6245; G06F 21/31
See application file for complete search history.

(56) References Cited

U.S. PATENT DOCUMENTS

| 10,360,241 | B2 | 7/2019 | Tamura | |
|---|---|---|---|---|
| 2004/0103306 | A1 | 5/2004 | Paddock et al. | |
| 2004/0260699 | A1* | 12/2004 | Aoki | G06F 21/6227 |
| | | | | 707/999.009 |
| 2017/0006066 | A1 | 1/2017 | Eckel | |
| 2020/0211409 | A1* | 7/2020 | Latorre | G16H 10/60 |
| 2021/0150058 | A1 | 5/2021 | Unagami et al. | |
| 2021/0390196 | A1* | 12/2021 | Lavine | G06F 21/6218 |

FOREIGN PATENT DOCUMENTS

| JP | 2004-295763 A | 10/2004 |
|---|---|---|
| JP | 2005-284353 A | 10/2005 |
| JP | 2006-507604 A | 3/2006 |
| JP | 4225815 B2 | 2/2009 |

(Continued)

*Primary Examiner* — Jason K Gee
(74) *Attorney, Agent, or Firm* — Finnegan, Henderson, Farabow, Garrett & Dunner, LLP

(57) ABSTRACT

According to one embodiment, a data management method performed by a computer, includes: receiving first request information for requesting to execute a first process on first data, the first data being data regarding a person; and determining whether the first process is executable, based on the first request information and consent information, the consent information including a first condition that the person consents to perform the first process.

17 Claims, 30 Drawing Sheets

(56) References Cited

FOREIGN PATENT DOCUMENTS

| | | |
|---|---|---|
| JP | 4881059 B2 | 2/2012 |
| JP | 2017-220112 A | 12/2017 |
| JP | 6333198 B2 | 5/2018 |
| JP | 2018-524727 A | 8/2018 |
| JP | 2020-181275 A | 11/2020 |
| WO | WO 2020/122095 A1 | 6/2020 |

* cited by examiner

ATTRIBUTE INFORMATION 1

| OWNER IDENTIFIER | U000001 |
|---|---|
| TYPE | T0001 |
| DETAILS 1 | D0001 |
| DETAILS 2 | 2020/08 |
| DETAILS 3 | 00001 |

PERSONAL DATA 1

| DATE AND TIME | BODY TEMPERATURE |
|---|---|
| 2020/08/01, 06:00 | 36.6 |
| 2020/08/02, 06:20 | 36.5 |
| 2020/08/03, 06:10 | 36.7 |
| ... | ... |

FIG. 2

TYPE AND DETAILS

| DATA TYPE IDENTIFIER | DESCRIPTION | DATA DETAIL IDENTIFIER | DESCRIPTION |
|---|---|---|---|
| T0001 | HEALTHCARE DATA | D0001 | BODY TEMPERATURE |
| | | D0002 | BODY WEIGHT |
| | | D0003 | THE NUMBER OF STEPS |
| T0002 | "a" DATA | D0004 | "a1" DATA |
| | | D0005 | "a2" DATA |

FIG. 3A

BUSINESS OPERATOR

| BUSINESS OPERATOR IDENTIFIER | DESCRIPTION |
|---|---|
| C001 | NAME, REPRESENTATIVE AND ADDRESS OF "c" COMPANY |
| C002 | NAME, REPRESENTATIVE AND ADDRESS OF "d" COMPANY |

FIG. 3B

PURPOSE

| PURPOSE IDENTIFIER | DESCRIPTION |
|---|---|
| P001 | FOR BUSINESS e |
| P002 | FOR RESEARCH f |

FIG. 3C

HANDLING AT WITHDRAWAL

| WITHDRAWAL IDENTIFIER | DESCRIPTION |
|---|---|
| N001 | STOP USE; DELETE NO DATA |
| N002 | DELETE DATA |

FIG. 3D

CONSENT INFORMATION 1

| CONSENT INFORMATION IDENTIFIER | I000001 |
|---|---|
| OWNER IDENTIFIER | U000001 |
| TYPE | T0001 |
| DETAILS1 | D0001 |
| DETAILS2 | 2020/08 |
| DETAILS3 | 00001 |
| PROVIDER BUSINESS OPERATOR | C002 |
| RECEIVER BUSINESS OPERATOR | C001 |
| CONSENT STATE TO DATA RECEPTION BY RECEIVER BUSINESS OPERATOR | CONSENT |
| CONSENT STATE TO DATA RETENTION BY RECEIVER BUSINESS OPERATOR | CONSENT |
| PURPOSE 1 OF RECEIVER BUSINESS OPERATOR | P001 |
| CONSENT STATE TO PURPOSE 1 | CONSENT |
| PURPOSE 2 OF RECEIVER BUSINESS OPERATOR | P002 |
| CONSENT STATE TO PURPOSE 2 | CONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

CONSENT INFORMATION 2

| CONSENT INFORMATION IDENTIFIER | I000002 |
|---|---|
| OWNER IDENTIFIER | U000001 |
| TYPE | T0001 |
| DETAILS1 | D0001 |
| DETAILS2 | 2020/08~2020/12 |
| DETAILS3 | UNCONSTRAINED |
| PROVIDER BUSINESS OPERATOR | C002 |
| RECEIVER BUSINESS OPERATOR | C001 |
| CONSENT STATE TO DATA RECEPTION BY RECEIVER BUSINESS OPERATOR | CONSENT |
| CONSENT STATE TO DATA RETENTION BY RECEIVER BUSINESS OPERATOR | CONSENT |
| PURPOSE 1 OF RECEIVER BUSINESS OPERATOR | P001 |
| CONSENT STATE TO PURPOSE 1 | CONSENT |
| PURPOSE 2 OF RECEIVER BUSINESS OPERATOR | P002 |
| CONSENT STATE TO PURPOSE 2 | CONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

| CONSENT INFORMATION 3 | |
|---|---|
| CONSENT INFORMATION IDENTIFIER | I000003 |
| OWNER IDENTIFIER | U000002 |
| TYPE | T0001 |
| DETAILS1 | D0001 |
| DETAILS2 | 2020/08 |
| DETAILS3 | O0001 |
| OBTAINER BUSINESS OPERATOR | C001 |
| CONSENT STATE TO DATA OBTAINMENT BY OBTAINER BUSINESS OPERATOR | CONSENT |
| CONSENT STATE TO DATA RETENTION BY OBTAINER BUSINESS OPERATOR | CONSENT |
| PURPOSE 1 OF OBTAINER BUSINESS OPERATOR | P001 |
| CONSENT STATE TO PURPOSE 1 | CONSENT |
| PURPOSE 2 OF OBTAINER BUSINESS OPERATOR | P002 |
| CONSENT STATE TO PURPOSE 2 | CONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

| CONSENT INFORMATION 4 | |
|---|---|
| CONSENT INFORMATION IDENTIFIER | I000004 |
| OWNER IDENTIFIER | U000001 |
| TYPE | T0001 |
| DETAILS1 | D0001,D0002 |
| DETAILS2 | UNCONSTRAINED |
| DETAILS3 | UNCONSTRAINED |
| USE BUSINESS OPERATOR | C001 |
| CONSENT STATE TO DATA RETENTION BY USE BUSINESS OPERATOR | CONSENT |
| PURPOSE 1 OF USE BUSINESS OPERATOR | P001 |
| PURPOSE 1 OF OBTAINER BUSINESS OPERATOR | CONSENT |
| PURPOSE 2 OF USE BUSINESS OPERATOR | P002 |
| CONSENT STATE TO PURPOSE 2 | CONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

REQUEST INFORMATION 1

| REQUEST TYPE | DISCLOSURE |
|---|---|
| OWNER IDENTIFIER | U000001 |
| TYPE | T0001 |
| DETAILS1 | D0001 |
| DETAILS2 | 2020/08 |
| DETAILS3 | 00001 |
| PROVIDER BUSINESS OPERATOR | C002 |
| RECEIVER BUSINESS OPERATOR | C001 |
| PURPOSE 1 OF RECEIVER BUSINESS OPERATOR | P001 |
| PURPOSE 2 OF RECEIVER BUSINESS OPERATOR | P002 |

REQUEST INFORMATION 2

| REQUEST TYPE | USE |
|---|---|
| OWNER IDENTIFIER | U000001 |
| TYPE | T0001 |
| DETAILS1 | UNCONSTRAINED |
| DETAILS2 | UNCONSTRAINED |
| DETAILS3 | UNCONSTRAINED |
| ANALYSIS BUSINESS OPERATOR | C001 |
| PURPOSE 1 OF ANALYSIS BUSINESS OPERATOR | P001 |
| PURPOSE 2 OF ANALYSIS BUSINESS OPERATOR | P002 |

REQUEST INFORMATION 3

| REQUEST TYPE | OBTAINMENT |
|---|---|
| OWNER IDENTIFIER | U000002 |
| TYPE | T0001 |
| DETAILS1 | D0001 |
| DETAILS2 | 2020/08 |
| DETAILS3 | 00001 |
| OBTAINER BUSINESS OPERATOR | C001 |
| PURPOSE 1 OF OBTAINER BUSINESS OPERATOR | P001 |
| PURPOSE 2 OF OBTAINER BUSINESS OPERATOR | P002 |

CONSENT INFORMATION 5

| CONSENT INFORMATION IDENTIFIER | I000005 |
|---|---|
| OWNER IDENTIFIER | U000001 |
| TYPE | T0001 |
| DETAILS1 | D0001 |
| DETAILS2 | UNCONSTRAINED |
| DETAILS3 | UNCONSTRAINED |
| PROVIDER BUSINESS OPERATOR | C002 |
| RECEIVER BUSINESS OPERATOR | C001 |
| CONSENT STATE TO DATA RECEPTION BY RECEIVER BUSINESS OPERATOR | CONSENT |
| CONSENT STATE TO DATA RETENTION BY RECEIVER BUSINESS OPERATOR | CONSENT |
| PURPOSE 1 OF RECEIVER BUSINESS OPERATOR | P001 |
| CONSENT STATE TO PURPOSE 1 | CONSENT |
| PURPOSE 2 OF RECEIVER BUSINESS OPERATOR | P002 |
| CONSENT STATE TO PURPOSE 2 | CONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

CONSENT INFORMATION 6

| CONSENT INFORMATION IDENTIFIER | I000006 |
|---|---|
| OWNER IDENTIFIER | U000001 |
| TYPE | T0001 |
| DETAILS1 | D0002 |
| DETAILS2 | UNCONSTRAINED |
| DETAILS3 | UNCONSTRAINED |
| PROVIDER BUSINESS OPERATOR | C002 |
| RECEIVER BUSINESS OPERATOR | C001 |
| CONSENT STATE TO DATA RECEPTION BY RECEIVER BUSINESS OPERATOR | CONSENT |
| CONSENT STATE TO DATA RETENTION BY RECEIVER BUSINESS OPERATOR | CONSENT |
| PURPOSE 1 OF RECEIVER BUSINESS OPERATOR | P001 |
| CONSENT STATE TO PURPOSE 1 | CONSENT |
| PURPOSE 2 OF RECEIVER BUSINESS OPERATOR | P002 |
| CONSENT STATE TO PURPOSE 2 | CONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

CORRECTED REQUEST INFORMATION 2

| REQUEST TYPE | USE |
|---|---|
| OWNER IDENTIFIER | U000001 |
| TYPE | T0001 |
| DETAILS1 | D0001,D0002 |
| DETAILS2 | UNCONSTRAINED |
| DETAILS3 | UNCONSTRAINED |
| ANALYSIS BUSINESS OPERATOR | C001 |
| PURPOSE 1 OF ANALYSIS BUSINESS OPERATOR | P001 |
| PURPOSE 2 OF ANALYSIS BUSINESS OPERATOR | P002 |

FIG. 8

ATTRIBUTE INFORMATION 2

| OWNER IDENTIFIER | U000001 |
|---|---|
| TYPE | T0002 |
| DETAILS1 | D0004 |
| DETAILS2 | 2020/08 |

REQUEST INFORMATION 4

| REQUEST TYPE | DISCLOSURE |
|---|---|
| OWNER IDENTIFIER | U000001 |
| TYPE | T002 |
| DETAILS1 | D004 |
| DETAILS2 | 2020/08 |
| PROVIDER BUSINESS OPERATOR | C002 |
| RECEIVER BUSINESS OPERATOR | C001 |
| PURPOSE 1 OF RECEIVER BUSINESS OPERATOR | P001 |
| PURPOSE 2 OF RECEIVER BUSINESS OPERATOR | P002 |

CONSENT INFORMATION 7

| CONSENT INFORMATION IDENTIFIER | C000007 |
|---|---|
| OWNER IDENTIFIER | U000001 |
| TYPE | T002 |
| DETAILS1 | UNCONSTRAINED |
| DETAILS2 | 2020/08 |
| PROVIDER BUSINESS OPERATOR | C002 |
| RECEIVER BUSINESS OPERATOR | C001 |
| CONSENT STATE TO DATA RECEPTION BY RECEIVER BUSINESS OPERATOR | CONSENT |
| CONSENT STATE TO DATA RETENTION BY RECEIVER BUSINESS OPERATOR | CONSENT |
| PURPOSE 1 OF RECEIVER BUSINESS OPERATOR | P001 |
| CONSENT STATE TO PURPOSE 1 | CONSENT |
| PURPOSE 2 OF RECEIVER BUSINESS OPERATOR | P002 |
| CONSENT STATE TO PURPOSE 2 | CONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

FIG. 9

DISCLOSURE RECORD INFORMATION

| RECORD IDENTIFIER | R000001 |
|---|---|
| RECORD TYPE | DISCLOSURE |
| RECORD BUSINESS OPERATOR (PROVIDER BUSINESS OPERATOR) | c002 |
| RECEIVER BUSINESS OPERATOR | NAME OF "c" COMPANY |
| CONSENT INFORMATION | C000005 |
| OWNER IDENTIFIER | U000001 |
| TYPE | T002 |
| DETAILS1 | D0004 |
| DETAILS2 | 2020/08 |
| DATE AND TIME | 2020/09/01 |

RECEPTION RECORD INFORMATION

| RECORD IDENTIFIER | R000002 |
|---|---|
| RECORD TYPE | RECEPTION |
| RECORD BUSINESS OPERATOR (RECEIVER BUSINESS OPERATOR) | c001 |
| PROVIDER BUSINESS OPERATOR | NAME, REPRESENTATIVE AND ADDRESS OF "d" COMPANY |
| CONSENT INFORMATION | C000005 |
| WAY OF OBTAINMENT | DOCUMENT |
| OWNER IDENTIFIER | U000001 |
| TYPE | T002 |
| DETAILS1 | D0004 |
| DETAILS2 | 2020/08 |
| DATE AND TIME | 2020/09/01 |

FIG. 10

ATTRIBUTE INFORMATION 2

| OWNER IDENTIFIER | U000001 |
|---|---|
| TYPE | T0002 |
| DETAILS1 | D0004 |
| DETAILS2 | 2020/08 |

REQUEST INFORMATION 5

| REQUEST TYPE | DISCLOSURE |
|---|---|
| OWNER IDENTIFIER | U000001 |
| TYPE | T002 |
| DETAILS1 | D004 |
| DETAILS2 | 2020/08 |
| USE BUSINESS OPERATOR | C001 |
| PURPOSE 1 OF USE BUSINESS OPERATOR | P001 |
| PURPOSE 2 OF USE BUSINESS OPERATOR | P002 |

CONSENT INFORMATION 7

| CONSENT INFORMATION IDENTIFIER | I000007 |
|---|---|
| OWNER IDENTIFIER | U000001 |
| TYPE | T002 |
| DETAILS1 | UNCONSTRAINED |
| DETAILS2 | 2020/08 |
| PROVIDER BUSINESS OPERATOR | C002 |
| RECEIVER BUSINESS OPERATOR | C001 |
| CONSENT STATE TO DATA RECEPTION BY RECEIVER BUSINESS OPERATOR | CONSENT |
| CONSENT STATE TO DATA RETENTION BY RECEIVER BUSINESS OPERATOR | CONSENT |
| PURPOSE 1 OF RECEIVER BUSINESS OPERATOR | P001 |
| CONSENT STATE TO PURPOSE 1 | CONSENT |
| PURPOSE 2 OF RECEIVER BUSINESS OPERATOR | P002 |
| CONSENT STATE TO PURPOSE 2 | CONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

FIG. 11

ATTRIBUTE INFORMATION3

| OWNER IDENTIFIER | U00001 |
|---|---|
| TYPE | T0003 |
| DETAILS 1 | D0006 |
| DETAILS 2 | 2020/08 |

RECORD INFORMATION ON DATA GENERATION

| RECORD IDENTIFIER | r000003 |
|---|---|
| RECORD TYPE | GENERATION |
| RECORD BUSINESS OPERATOR (ANALYSIS BUSINESS OPERATOR) | C001 |
| CONSENT INFORMATION | C000005 |
| USE DATA OWNER IDENTIFIER | U000001 |
| USE DATA TYPE | T0002 |
| USE DATA DETAIL1 | D0004 |
| USE DATA DETAIL2 | 2020/08 |
| GENERATED DATA OWNER IDENTIFIER | U000001 |
| GENERATED DATA TYPE | T0003 |
| GENERATED DATA DETAIL1 | D0006 |
| GENERATED DATA DETAIL2 | 2020/08 |
| DATE AND TIME | 2020/09/05 |

FIG. 12

ATTRIBUTE INFORMATION 1

| OWNER IDENTIFIER | U000002 |
|---|---|
| TYPE | T0001 |
| DETAILS1 | D0001 |
| DETAILS2 | 2020/08 |
| DETAILS3 | 00001 |

REQUEST INFORMATION 3

| REQUEST TYPE | USE |
|---|---|
| OWNER IDENTIFIER | U000002 |
| TYPE | T0001 |
| DETAILS1 | D0001 |
| DETAILS2 | 2020/08 |
| DETAILS3 | 00001 |
| OBTAINER BUSINESS OPERATOR | C001 |
| PURPOSE 1 OF OBTAINER BUSINESS OPERATOR | P001 |
| PURPOSE 2 OF OBTAINER BUSINESS OPERATOR | P002 |

CONSENT INFORMATION 3

| CONSENT INFORMATION IDENTIFIER | I000003 |
|---|---|
| OWNER IDENTIFIER | U000002 |
| TYPE | T0001 |
| DETAILS1 | D0001 |
| DETAILS2 | 2020/08 |
| DETAILS3 | 00001 |
| OBTAINER BUSINESS OPERATOR | C001 |
| CONSENT STATE TO DATA OBTAINMENT BY OBTAINER BUSINESS OPERATOR | CONSENT |
| CONSENT STATE TO DATA RETENTION BY OBTAINER BUSINESS OPERATOR | CONSENT |
| PURPOSE 1 OF RECEIVER BUSINESS OPERATOR | P001 |
| CONSENT STATE TO PURPOSE 1 | CONSENT |
| PURPOSE 2 OF RECEIVER BUSINESS OPERATOR | P002 |
| CONSENT STATE TO PURPOSE 2 | CONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

FIG. 13

OBTAINMENT RECORD INFORMATION

| RECORD IDENTIFIER | R000004 |
|---|---|
| RECORD TYPE | OBTAINMENT |
| RECORD BUSINESS OPERATOR (OBTAINER BUSINESS OPERATOR) | C001 |
| CONSENT INFORMATION | C000008 |
| OWNER IDENTIFIER | U000001 |
| TYPE | T0002 |
| DETAILS1 | D0004 |
| DETAILS2 | 2020/08 |
| DATE AND TIME | 2020/09/01 |

FIG. 14

ATTRIBUTE INFORMATION 2

| OWNER IDENTIFIER | U000001 |
|---|---|
| TYPE | T0002 |
| DETAILS1 | D0004 |
| DETAILS2 | 2020/08 |

ATTRIBUTE INFORMATION 3

| OWNER IDENTIFIER | U000001 |
|---|---|
| TYPE | T0002 |
| DETAILS1 | D0005 |
| DETAILS2 | 2020/08 |

CONSENT INFORMATION 8

| CONSENT INFORMATION IDENTIFIER | C000008 |
|---|---|
| OWNER IDENTIFIER | U000001 |
| TYPE | T0002 |
| DETAILS1 | UNCONSTRAINED |
| DETAILS2 | 2020/08 |
| USE BUSINESS OPERATOR | C001 |
| CONSENT STATE TO DATA RETENTION BY BUSINESS OPERATOR | CONSENT |
| PURPOSE 1 OF BUSINESS OPERATOR | P001 |
| CONSENT STATE TO PURPOSE 1 | CONSENT |
| PURPOSE 2 OF BUSINESS OPERATOR | P002 |
| CONSENT STATE TO PURPOSE 2 | CONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

CONSENT INFORMATION 9

| CONSENT INFORMATION IDENTIFIER | C000009 |
|---|---|
| OWNER IDENTIFIER | U000001 |
| TYPE | T0002 |
| DETAILS1 | D0004 |
| DETAILS2 | 2020/08 |
| USE BUSINESS OPERATOR | C001 |
| CONSENT STATE TO DATA RETENTION BY BUSINESS OPERATOR | CONSENT |
| PURPOSE 1 OF BUSINESS OPERATOR | P001 |
| CONSENT STATE TO PURPOSE 1 | CONSENT |
| PURPOSE 2 OF BUSINESS OPERATOR | P002 |
| CONSENT STATE TO PURPOSE 2 | NONCONSENT |
| CONSENT STATE TO HOLDING OF CONSENT INFORMATION AND RECORD INFORMATION | CONSENT |
| CONSENT TIME PERIOD | UNCONSTRAINED |
| HANDLING AT WITHDRAWAL | N001 |
| CONSENT DATE AND TIME | 2020/09/01 |

FIG. 23

| STATE 1 | |
|---|---|
| OWNER IDENTIFIER | U000001 |
| TYPE | T0002 |
| DETAILS1 | D0004 |
| DETAILS2 | 2020/08 |
| BUSINESS OPERATOR | C001 |
| PURPOSE 1 OF BUSINESS OPERATOR | P001 |
| CONSENT STATE TO PURPOSE 1 | CONSENT |
| PURPOSE 2 OF BUSINESS OPERATOR | P002 |
| CONSENT STATE TO PURPOSE 2 | CONSENT |

| STATE 2 | |
|---|---|
| OWNER IDENTIFIER | U000001 |
| TYPE | T0002 |
| DETAILS1 | D0004 |
| DETAILS2 | 2020/08 |
| BUSINESS OPERATOR | C001 |
| PURPOSE 1 OF BUSINESS OPERATOR | P001 |
| CONSENT STATE TO PURPOSE 1 | CONSENT |
| PURPOSE 2 OF BUSINESS OPERATOR | P002 |
| CONSENT STATE TO PURPOSE 2 | NONCONSENT |

| | |
|---|---|
| OWNER IDENTIFIER | U000001 |
| TYPE | T0002 |
| DETAILS1 | D0005 |
| DETAILS2 | 2020/08 |
| BUSINESS OPERATOR | C001 |
| PURPOSE 1 OF BUSINESS OPERATOR | P001 |
| CONSENT STATE TO PURPOSE 1 | CONSENT |
| PURPOSE 2 OF BUSINESS OPERATOR | P002 |
| CONSENT STATE TO PURPOSE 2 | CONSENT |

| | |
|---|---|
| OWNER IDENTIFIER | U000001 |
| TYPE | T0002 |
| DETAILS1 | D0005 |
| DETAILS2 | 2020/08 |
| RETENTION BUSINESS OPERATOR | C001 |
| PURPOSE 1 OF BUSINESS OPERATOR | P001 |
| CONSENT STATE TO PURPOSE 1 | CONSENT |
| PURPOSE 2 OF BUSINESS OPERATOR | P002 |
| CONSENT STATE TO PURPOSE 2 | CONSENT |

FIG. 24

| OWNER IDENTIFIER1 | OWNER IDENTIFIER2 | OWNER IDENTIFIER3 | OWNER IDENTIFIER4 |
|---|---|---|---|
| U1-000001 | U2-000001 | @username1 | First1.Last1@mail.com |
| U1-000002 | U2-000005 | @username2 | First2.Last2@mail.com |
| U1-000003 | U2-000002 | @username3 | First3.Last3@mail.com |
| ... | ... | ... | ... |

FIG. 27

| OWNER IDENTIFIER1 | OWNER IDENTIFIER2 | OWNER IDENTIFIER3 | OWNER IDENTIFIER4 |
|---|---|---|---|
| U1-000001 | DKGLANCK | Username1 | First1.Last1@mail.com |
| U1-000002 | PEQZLFMA | Username2 | First2.Last2@mail.com |
| U1-000003 | PWODLFJO | Username3 | First3.Last3@mail.com |
| ... | ... | ... | ... |

FIG. 29

DATA MANAGEMENT METHOD, NON-TRANSITORY COMPUTER READABLE MEDIUM, AND DATA MANAGEMENT SYSTEM

CROSS REFERENCE TO RELATED APPLICATIONS

This application is based upon and claims the benefit of priority from the prior Japanese Patent Application No. 2020-186046, filed on Nov. 6, 2020, the entire contents of which are incorporated herein by reference.

FIELD

Embodiments described herein relate to a data management method, a non-transitory computer readable medium, and a data management system.

BACKGROUND

According to Act on the Protection of Personal Information (hereinafter called Personal Information Protection Act), when a personal information handling business operator provides personal data for a third party, the consent of the relevant individual is required to be obtained. In a service utilizing personal data, collection of personal data items as many as possible can provide services having high added values. To collect personal data efficiently, it is desired to verify the consent of the relevant person efficiently.

BRIEF DESCRIPTION OF THE DRAWINGS

FIG. 2 shows an example of personal data and its attribute information;

FIGS. 3A to 3D illustrate examples of data type and details, the purpose of a business operator, and an example of handling at withdrawal of consent information;

FIG. 4 shows two examples of the consent information;

FIG. 5 shows other examples of the consent information;

FIG. 6 shows three examples of the request information;

FIG. 7 shows examples of two pieces of consent information coinciding with part of the request information shown in FIG. 6;

FIG. 8 shows corrected request information;

FIG. 9 shows examples of attribute information on personal data, request information, and consent information;

FIG. 10 shows an example of disclosure record information, and an example of reception record information;

FIG. 11 shows examples of attribute information on personal data, request information, and consent information;

FIG. 12 shows examples of attribute information on personal data, request information, and consent information;

FIG. 13 shows examples of attribute information on personal data, request information, and consent information;

FIG. 14 shows an example of obtainment record information;

FIG. 23 shows examples of the consent information;

FIG. 24 shows an update example of states held in a state holding device;

FIG. 27 shows an example of an association table;

FIG. 29 shows an example of an association table where owner identifiers are pseudonyms.

DETAILED DESCRIPTION

Figure 1:
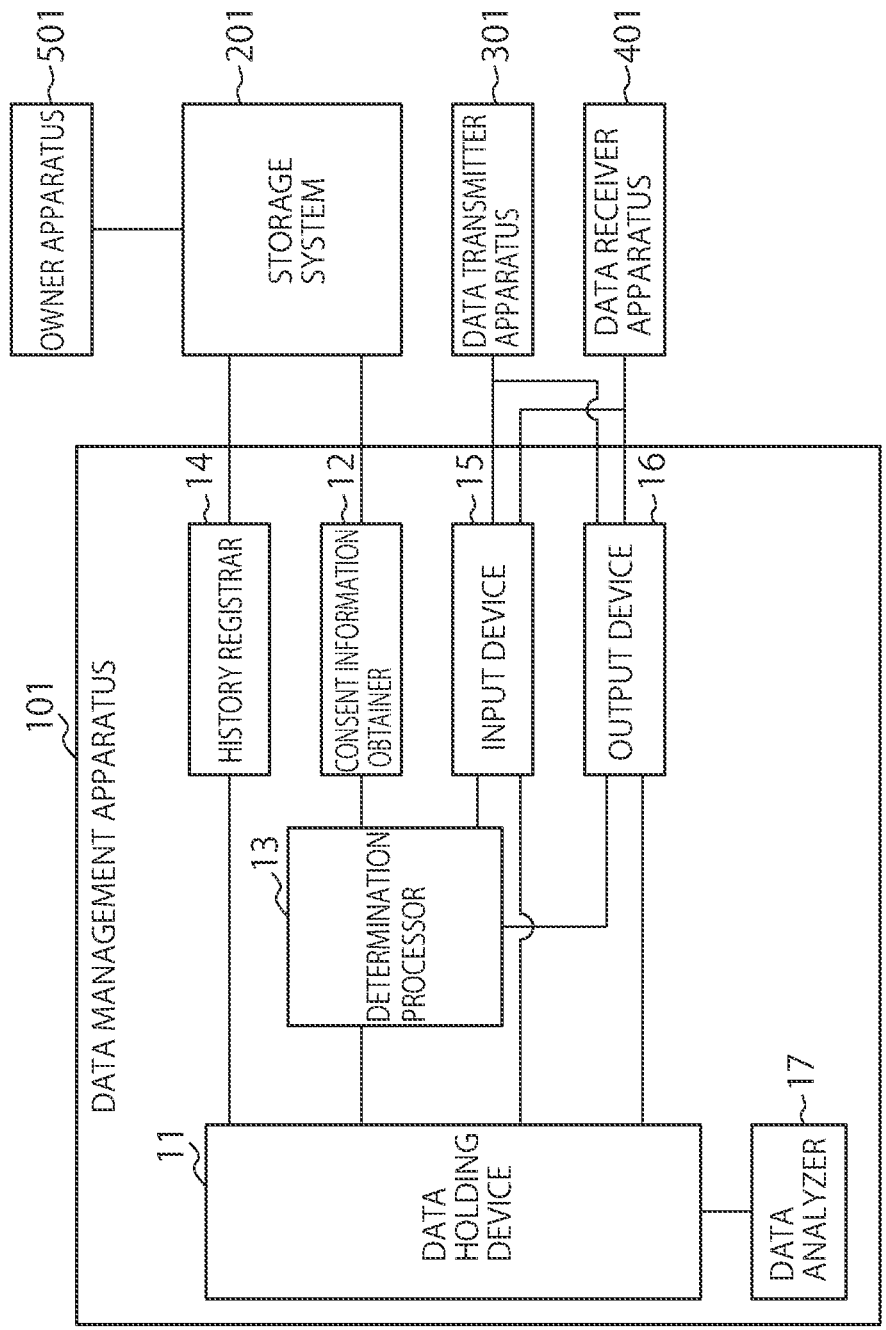
FIG. 1 is an overall configuration diagram of a data management system according to a first embodiment.

According to one embodiment, a data management method performed by a computer, includes: receiving first request information for requesting to execute a first process on first data, the first data being data regarding a person; and determining whether the first process is executable, based on the first request information and consent information, the consent information including a first condition that the person consents to perform the first process.

Hereinafter, referring to the drawings, embodiments of the present invention are described.

First Embodiment

FIG. 1 is an overall configuration diagram of a data management system according to a first embodiment. The data management system in FIG. 1 includes a data management apparatus 101 (computer), a consent information and history information storage system 201 (hereinafter described as a storage system 201), a data transmitter apparatus 301, a data receiver apparatus 401, and an owner apparatus 501.

The data management apparatus 101 is connected to the storage system 201, the data transmitter apparatus 301, and the data receiver apparatus 401, via a communication network. The data management apparatus 101 may be connected to the owner apparatus 501 via the communication network. The owner apparatus 501 is connected to the storage system 201 via the communication network. The data transmitter apparatus 301 and the data receiver apparatus 401 may be connected to the storage system 201 via the communication network. Each communication network may be a wide area network such as the Internet or a mobile network, a local area network such as an Ethernet or a wireless LAN (Local Area Network), or a cable such as a serial communication cable. For example, the data management apparatus 101 may be a computer that includes, a processor, such as a CPU (Central Processing Unit), and a memory.

The data management apparatus 101 receives request information (first request information) for a request to perform a process (first process) on data about a certain person; the request is issued by an apparatus or a system of a business operator that manages the data management apparatus 101 (an apparatus or a system other than the data management apparatus 101 shown in the diagram), the data transmitter apparatus 301, the data receiver apparatus 401, and the owner apparatus 501. Transmission of the request information issued from the data transmitter apparatus 301 or the data receiver apparatus 401 to the data management apparatus 101 may be performed by the apparatus or the system of the business operator that manages the data management apparatus 101 (the apparatus or the system other than the data management apparatus 101 shown in the diagram) or the owner apparatus 501 requesting the data transmitter apparatus 301 or the data receiver apparatus 401 to transmit the request information. Examples of the data about the person include personal data (first personal data), and analysis result data (data generated based on the personal data) obtained by analyzing the personal data. Hereinafter, in a case where it is simply described as data, the description means data about the person, which may be any of personal data, and analysis result data. The first request information is, for example, information for requesting disclosure of data to another business operator, a data use (analysis etc.), or obtainment of data from the person. The disclosure of data to another business operator means at least one of data reception and retention (holding) in view from the other business operator. Accordingly, request for providing data includes a request for at least one of data reception and retention (holding). The data management apparatus 101 obtains, from the storage system 201, consent information that includes a consent condition (first condition) of the person's consent to performing the first process on this person's data. The data management apparatus 101 determines whether the first process is executable to the data, on the basis of the obtained consent information and the first request information. The data management apparatus 101 performs the first process on the data, according to the determination result of whether execution is possible. When the data management apparatus 101 performs the first process, this system creates record information that indicates the content of the first process and the like, and registers the record information in the storage system 201.

The owner apparatus 501 is an apparatus operated by the person who is the owner of the personal data. The owner apparatus 501 is, for example, a note-type or desktop-type personal computer (PC), a smartphone, a tablet terminal, etc. The person can register at least one piece of consent information, in the storage system 201, from the owner apparatus 501. The person can transmit personal data from the owner apparatus 501 to the data management apparatus 101. That is, the data management apparatus 101 can receive (obtain) the personal data from the owner apparatus 501.

The storage system 201 stores consent information on one or more people. The storage system 201 stores a history of record information indicating the content and the like of processes performed in the data management apparatus 101. The storage system 201 is a system that can store information. In the storage system 201, a part that stores the consent information corresponds to a consent information storage, and a part that stores the history of the record information corresponds to a record information storage. The storage system 201 is, for example, a blockchain system or a database. In the case where the storage system 201 is a blockchain system, the consent information and the record information may be managed as respective transactions by the same blockchain, or managed by different blockchain systems. Also in the case where the storage system 201 is a database, the consent information and the record information may be managed by the same database, or managed by different databases.

The data transmitter apparatus 301 is an apparatus that requests the data management apparatus 101 to process (provide, use (analyze or the like), obtain or the like) data, such as personal data. Alternatively, in some cases, the data transmitter apparatus 301 receives a request about data processing issued by an apparatus or a system of a business operator that manages the data management apparatus 101 (an apparatus or a system other than the data management apparatus 101 shown in the diagram) or the owner apparatus 501, and causes the data management apparatus 101 to process data on the basis of the request. The data transmitter apparatus 301 is operated by, for example, a staff member (user) working at the business operator that manages the data transmitter apparatus 301. The data transmitter apparatus 301 transmits the request information to the data management apparatus 101. Alternatively, the data transmitter apparatus 301 receives the request information. Depending on the type of the request information, data serving as a processing target is also transmitted to the data management apparatus 101. The data transmitter apparatus 301 may be another data management apparatus (an apparatus having a configuration equivalent to that of the data management apparatus 101) different from the data management apparatus 101. The business operator that manages the data management apparatus 101 and the business operator that manages the data transmitter apparatus 301 may be the same business operator. The business operator that manages the data management apparatus 101 and the business operator that manages the data transmitter apparatus 301 may be different business operators. The data transmitter apparatus 301 may be the same as the owner apparatus 501, in some cases.

The data receiver apparatus 401 is an apparatus that receives data (personal data, analysis result data or the like) from the data management apparatus 101. In some cases, the data receiver apparatus 401 receives a request about data processing (providing, using (analyzing or the like) or the like) issued by an apparatus or a system of the business operator that manages the data management apparatus 101 (an apparatus or a system other than the data management apparatus 101 shown in the diagram) or the owner apparatus 501, and causes the data management apparatus 101 to process data on the basis of the request. The data receiver apparatus 401 may request the data management apparatus 101 to process (provide, use (analyze or the like), obtain or the like) data, such as personal data. The data receiver apparatus 401 is operated by, for example, a staff member (user) working at the business operator that manages the data receiver apparatus 401. The data receiver apparatus 401 transmits the request information to the data management apparatus 101. Alternatively, the data receiver apparatus 401 receives the request information. The data receiver apparatus 401 receives data from the data management apparatus 101. The data receiver apparatus 401 may be another data management apparatus (an apparatus having a configuration equivalent to that of the data management apparatus 101) different from the data management apparatus 101. The business operator that manages the data management apparatus 101 and the business operator that manages the data receiver apparatus 401 may be the same business operator. The business operator that manages the data management apparatus 101 and the business operator that manages the data receiver apparatus 401 may be different business operators.

The business operator of the data receiver apparatus 401 and the business operator of the data transmitter apparatus 301 may be the same as each other. The data receiver apparatus 401 and the data transmitter apparatus 301 may be the same apparatus. The business operator of the data management apparatus 101 may be the same as at least one of the business operators of the data transmitter apparatus 301 and the data receiver apparatus 401.

Hereinafter, "personal data", "consent information" and "request information" are described.

FIG. 2 shows personal data 1 and attribute information 1 as examples of the personal data and its attribute information. The attribute information includes one or more attributes of the personal data. The attribute information on the personal data 1 is the attribute information 1. The attribute information 1 includes an owner identifier of the data, the data type (type), and one or more data details (details). In some cases, the details are not included. In the example in FIG. 2, a detail 1, a detail 2, and a detail 3 are shown.

The owner identifier is an identifier assigned to the owner (person) of the data. In this embodiment, the owner identifier has a common value among the data management apparatus 101, the storage system 201, the data transmitter apparatus 301, and the data receiver apparatus 401. The values of the type and the details are identifiers, character strings, date type data or numerals, etc.

FIG. 3A shows examples of the types and details of data. The types are represented as data type identifiers. The details are represented as data detail identifiers. The data type identifier "T0001" indicates healthcare data. "T0001" is associated with data detail identifiers "D0001", "D0002" and "D0003". "D0001", "D0002" and "D0003" represent the body temperature, the body weight and the number of steps, respectively.

In the aforementioned example in FIG. 2, the detail 1 has a value "D0001". The detail 2 indicates the date. The detail 3 indicates any numeral (e.g., an index number etc.). The personal data 1 in FIG. 2 includes values of body temperatures of the person having the owner identifier "U000001" on the respective days in August 2020.

FIG. 3B shows examples of business operator identifiers. FIG. 3C shows examples of identifiers (purpose identifiers) indicating purposes of data processing. FIG. 3D shows examples of withdrawal identifiers about handling at withdrawal of consent information. The information in FIG. 3B to D is used for consent information, request information and the like, which are described later.

Next, the consent information is described. The consent information includes the consent information identifier, owner identifier, data type (type), details, one or more business operators, consent target event, consent state to the event (consent/nonconsent), consent time period, handling at withdrawal, and consent date and time. The details are not included, in some cases.

FIG. 4 shows consent information 1 and consent information 2 as two examples of the consent information. The consent information 1 and the consent information 2 include the consent information identifier, owner identifier, type, details, provider business operator, receiver business operator, consent target event, consent state to the consent target (consent/nonconsent), consent time period, handling at withdrawal, and consent date and time. The consent information does not include the details, in some cases. The consent target event is, for example, data reception by the receiver business operator, data retention by the receiver business operator, use for a reception or retention purpose, and storing of consent information and record information. The receiver business operator is a business operator that receives data, and retains or stores the received data, in some cases. The consent information identifier is information for identifying the consent information.

FIG. 5 shows consent information 3 and consent information 4 as other examples of the consent information. The consent information 3 includes the consent information identifier, owner identifier, type, details, obtainer business operator, consent target event, consent state to the consent target (consent/nonconsent), consent time period, handling at withdrawal, and consent date and time. The consent information does not include the details, in some cases. The consent target event is, for example, data obtainment by the obtainer business operator, data retention (storing) by the obtainer business operator, use for an obtaining purpose, and storing of consent information and record information. The obtainer business operator is a business operator that obtains the personal data from the owner apparatus 501 of the person or the data transmitter apparatus 301, and is a business operator ("C001") of the data management apparatus 101 in the example in the diagram.

The consent information 4 includes the consent information identifier, owner identifier, type, details, use business operator, consent target event, consent state to the consent target (consent/nonconsent), consent time period, handling at withdrawal, and consent date and time. The consent information may further include details. The consent target event is, for example, data retention by the use business operator, use for a purpose of the use business operator, and storing of consent information and record information. The use business operator is a business operator that performs use, such as data analysis, and generates data, such as an analysis result.

Next, the request information is described. The request information is information for requesting the data management apparatus 101 to perform a process. The type of request is, for example, disclosure, use (analysis or the like), and obtainment.

At the left in FIG. 6, request information 1 is indicated as an example of request information in a case where the request type is disclosure. When the type of the request is disclosure, the request information includes the owner identifier, data type (type), details, provider business operator, receiver business operator, and one or more purposes of reception and retention (storing) of the receiver business operator. The request information 1 does not include the details, in some cases. The disclosure requests the providing target business operator to perform reception and retention (holding).

At the center of FIG. 6, request information 2 is shown as an example of request information in a case where the request type is use. When the request type is use, the request information includes the owner identifier, data type (type), details, use business operator (analysis business operator in the example in the diagram), and one or more purposes of data use by the use business operator (an analysis business operator in the example in the diagram). The request information 2 does not include the details, in some cases. The data use includes performing of a certain process on data (first data) to generate new data (second data). For example, healthcare data is analyzed to generate analysis result data about the health condition.

At the right of FIG. 6, request information 3 is shown as an example of request information in a case where the request type is obtainment. When the type of the request is obtainment, the request information includes the owner identifier, data type (type), details, obtainer business operator, and one or more obtainment purposes of the obtainer business operator. The request information 3 does not include the details, in some cases.

Hereinafter, each component of the data management apparatus 101 is described. The data management apparatus 101 includes a data holding device 11, a consent information obtainer 12, a determination processor 13, a history registrar 14, an input device 15, an output device 16, and a data analyzer 17. All or part of the information obtainer 12, the determination processor 13, the history registrar 14 and the data analyzer 17 may be configured by processing circuitry as one example. Elements included in the data management apparatus 101 are not limited thereto. For example, this system may include: an input interface that receives information or an instruction, and an output interface, such as a display device that displays information or data.

The input device 15 receives request information for a process (disclosure, use (analysis etc.), obtainment or the like), from the data transmitter apparatus 301, or the data receiver apparatus 401, or the owner apparatus 501, or an apparatus or a system of the business operator that manages the data management apparatus 101, and transmits the received request information to the determination processor 13. The input device 15 is an example of a receiving unit or receiving circuitry that receives the request information. The input device 15 receives data (personal data etc.) about the person from the data transmitter apparatus 301, and transmits the received data to the data holding device 11. As described above, the input device 15 may receive at least one of the request information and the data, from an apparatus other than the data transmitter apparatus 301. For example, at least one of the request information and the data may be received from an apparatus operated by an administrator of the data management apparatus 101, the owner apparatus 501 or the like.

The determination processor 13 receives the request information from the input device 15, and transmits an instruction for obtaining the consent information, on the basis of the received request information, to the consent information obtainer 12.

The consent information obtainer 12 requests the storage system 201 to read the consent information having the coincident owner identifier on the basis of the request information, and receives the consent information from the storage system 201. The consent information obtainer 12 may receive, from the storage system 201, only the latest consent information (for example, the consent information having the latest consent date). The consent information obtainer 12 may receive all the pieces of consent information, or all the pieces of consent information in a certain time period. All the pieces of consent information having the coincident owner identifier may be received. In the request information, consent information where the owner identifier and other one or more items coincide may be received.

The determination processor 13 receives the consent information obtained by the consent information obtainer 12, and determines whether the process requested by the request information is executable, on the basis of whether the request information satisfies the consent information. The determination processor 13 transmits information indicating the determination result, to the data holding device 11 and the output device 16.

A first example of a determination method by the determination processor 13 is described with reference to the aforementioned FIGS. 4, 5 and 6.

The request information is assumed to be the request information 1 in FIG. 6. The consent information is identified that has coincident comparison items, such as the owner identifier, type, details, provider business operator, receiver business operator, and reception (or retention) purpose by the receiver business operator in the request information 1. As for the purpose, it is only required that the purpose of the consent information includes the purpose of the request information 1; a purpose that is not in the request information 1 may be included in the consent information. When all of the consent state to data reception by the receiver business operator, the consent state to the data retention (data holding) by the receiver business operator, and the consent state to the purpose included in the request information 1 are "CONSENT" in the identified consent information, the request information 1 satisfies the consent information (satisfies a first condition included in the consent information). Any purpose that is not in the request information 1 may be nonconsent in the consent information. If there are multiple identified pieces of consent information, each consent state is determined for the latest consent information. If the request information 1 satisfies the consent information, the process requested by the request information 1 is determined to be executable. The aforementioned consent information 1 in FIG. 4 is consent information that the request information 1 satisfies. Consequently, when the consent information 1 is obtained, the process requested by the request information 1 is determined to be executable. If there is no consent information that the request information 1 satisfies, the process requested by the request information 1 is determined to be inexecutable. For example, even if there is consent information having coincident comparison items, the process where the consent state is "NONCONSENT" is determined to be inexecutable. It can be determined whether the information is latest or not, for example, on the basis of the consent date (consent date and time) included in the consent information. Alternatively, a timestamp may be assigned to the consent information to be registered in the storage system 201, and determination may be made on the basis of the timestamp.

A second example of the determination method by the determination processor 13 is described with reference to the aforementioned FIG. 6. The request type of the request information 2 shown in FIG. 6 is use. The consent information is identified where all the owner identifier, the type and the details of the request information 2 coincide, the use business operator (analysis business operator in this example) of the request information 2 coincides with the use business operator of the consent information, and the purpose coinciding with the use purpose of the business operator of the request information 2 is included. As for the purpose, it is only required that the purpose of the consent information includes the purpose of the request information 2; a purpose that is not in the request information 2 may be included in the consent information. If all the consent states to the use purpose included in the request information 2 are "CONSENT" in the identified consent information, the request information 2 satisfies the consent information (satisfies the first condition included in the consent information). The purpose that is not in the request information 2 may be nonconsent in the consent information. If there are multiple identified pieces of consent information, each consent state is determined for the latest consent information. If the request information 2 satisfies the consent information, the process requested by the request information 2 is determined to be executable. The aforementioned consent information 4 in FIG. 5 is consent information that the request information 2 satisfies. If there is no consent information that the request information 2 satisfies, the process requested by the request information 2 is determined to be inexecutable. For example, even if there is consent information having coincident comparison items, the process where the consent state is "NONCONSENT" is determined to be inexecutable.

A third example of the determination method by the determination processor 13 is described with reference to the aforementioned FIG. 6. The request type of the request information 3 shown in FIG. 6 is obtainment. The consent information is identified where all the owner identifier, the type and the details of the request information 3 coincide, the obtainer business operator (the business operator of the data management apparatus 101 in this example) of the request information 3 coincides with the obtainer business operator of the consent information, and the purpose coinciding with the obtainment purpose of the obtainer business operator of the request information 3 is included. As for the purpose, it is only required that the consent information consents to the purpose of the request information 3; it may be nonconsent to a purpose that is not in the request information 3. If all the consent states to the purpose included in the request information 3 are "CONSENT" in the identified consent information, the request information 3 satisfies the consent information. If there are multiple identified pieces of consent information, each consent state is determined for the latest consent information. If the request information 3 satisfies the consent information, the process requested by the request information 3 is determined to be executable. The aforementioned consent information 3 in FIG. 5 is consent information that the request information 5 satisfies. If there is no consent information that the request information 5 satisfies, the process requested by the request information 5 is determined to be inexecutable. For example, even if there is consent information having coincident comparison items, the process where the consent state is "NONCONSENT" is determined to be inexecutable.

The range of the consent information is wider than that of the request information, in some cases. In such cases, if the consent information on each item is "CONSENT", the request information satisfies the consent information. Hereinafter, an example of such cases is described.

In the aforementioned consent information 2 shown in FIG. 4, the detail 3 is "UNCONSTRAINED". Accordingly, the detail 3 of the request information 1 may have any value. The date type information "2020/08" of the detail 2 of the request information 1 is included in the date type information "2020/01-2020/12" of the detail 2 of the consent information 2. The consent state of each item is "CONSENT". Consequently, the request information 1 satisfies the consent information 2.

Conversely, the range of the request information is wider than that of the consent information, in some cases. That is, only part of data for which a process is requested by the request information satisfies the consent information (first condition), in some cases. In this case, the process is permitted to be executed only for the part of the personal data for which the process is requested. Hereinafter, an example of such cases is described with reference to FIG. 7.

FIG. 7 shows consent information 5 and consent information 6 that coincide with part of the request information 2 shown in FIG. 6. Each of the consent information 5 and the consent information 6 has an owner identifier "U00001" identical to that of the request information 2.

The details 1 to 3 of the request information 2 are "UNCONSTRAINED". The details 1 of the consent information 5 and the consent information 6 are "D0001" and "D0002", respectively. Accordingly, the process requested by the request information 2 is determined to be allowed limitedly only for "D0001" and "D0002" with respect to the detail 1. As a result of determination, the request information 2 is corrected to be subjected to an internal process of the data management apparatus 101.

FIG. 8 shows the corrected request information 2. The determination processor 13 determines that the process requested by the corrected request information 2 is executable. Registration of record information on the process in the storage system 201 is also performed on the basis of the corrected request information 2. In another example, the owner identifier of the request information may be "UNCONSTRAINED". In this case, the request information means that the target of the information encompasses all the people who consent.

When the request information requests a process of providing data (e.g., personal data) for the data management apparatus 101 (data holding and reception by the data management apparatus 101), the data holding device 11 receives, from the input device 15, the data to be held. If the determination result by the determination processor 13 indicates that the process is executable, the data is stored in the internal storage. If inexecutable, the data is deleted. After the determination processor 13 determines that the process is executable, the input device 15 may receive the data from the data transmitter apparatus 301. In this case, if the process is determined to be inexecutable, the data is not received, which negates the need of an operation of deleting the data.

When the request information requests a process of providing (transmitting) data (e.g., personal data) for the data receiver apparatus 401, the data holding device 11 reads the data from the internal storage after the process is determined to be executable by the determination processor 13. The data holding device 11 transmits the data to the data receiver apparatus 401 via the output device 16. Note that the transmission destination of the data may be an apparatus other than the data receiver apparatus 401, in some cases.

When the request information requests a process of using (for example, analyzing) data (e.g., personal data), the data holding device 11 reads one or more data items to be analyzed from the internal storage after the process is determined to be executable by the determination processor 13, and transmits the data items to the data analyzer 17.

The data analyzer 17 performs a predetermined analysis on the data, and transmits analysis result data to the data holding device 11. The analysis result data includes attribute information. The attribute information includes multiple attributes of the analysis result data. The data holding device 11 stores the analysis result data in the internal storage. If the data analysis request includes a request for providing analysis data, the data holding device 11 transmits the analysis result data to the output device 16.

The output device 16 transmits the determination result of whether execution of the process is possible by the determination processor 13, to the data transmitter apparatus 301 or to the data receiver apparatus 401 wherein the data transmitter apparatus 301 or the data receiver apparatus 401 is the originator of the request information. The determination result may be transmitted to the owner apparatus 501, or an apparatus or a system of the business operator that manages the data management apparatus 101 wherein the owner apparatus 501 or the apparatus or the system of the business operator that manages the data management apparatus 101 is the originator of the request information. The output device 16 transmits the data (the personal data, analysis result data, etc.) received from the data holding device 11, to the data receiver apparatus 401 of the business operator designated as the receiver business operator, the use business operator, the obtainer business operator or the like. Note that the use business operator or the obtainer business operator is the business operator of the data management apparatus 101. In a case where the data transmitter apparatus 301 or the data receiver apparatus 401 is the apparatus identical to the data management apparatus 101, transmission is not required. The output device 16 is an example of a transmitter or transmitting circuitry that transmits the determination result, data or the like.

The history registrar 14 generates record information that indicates the content of the process in order to record the history of processes performed by the data holding device 11. The record information includes the attribute information. The attribute information includes the multiple attributes of the record information. Examples of the processes include disclosure, use (analysis etc.), obtainment and the like of data (personal data, analysis result data or the like). In a case where a business operator that receives data is present, reception record information may be generated. The history registrar 14 transmits the record information to the storage system 201. The storage system 201 records the received record information in this system. The record information may be used for an audit.

Referring to FIGS. 9 and 10, specific examples of generating the record information are described.

FIG. 9 shows attribute information 2, request information 4, and consent information 7, as examples of the attribute information on the personal data, request information, and consent information. The request information 4 requests providing of the personal data on the attribute information 2 from a business operator "C002" (provider business operator) to a business operator "C001" (receiver business operator). The request information 4 satisfies the consent information 7.

At the left of FIG. 10, an example of disclosure record information is shown. The disclosure record information includes a record identifier, a record type ("DISCLOSURE" in this example), a record business operator (provider business operator) having performed recording in the storage system 201, the name of the receiver business operator, the consent information identifier, information identifying the personal data (the owner identifier, type, details, etc.), and date and time (providing date and time). After the personal data is provided, the history registrar 14 of the data management apparatus 101 generates the disclosure record information.

At the right of FIG. 10, an example of reception record information is shown. The reception record includes a record identifier, a record type ("RECEPTION" in this example), a record business operator (receiver business operator) having performed recording in the storage system 201, the name of the provider business operator, the consent information identifier, way of obtainment, information identifying the data (the attributes of the data), and providing date and time. The way of obtainment designates document 1 that includes information about how a provider has obtained the personal data. The document 1 is, for example, a personal data sales contract, a contract indicating the way of obtainment, a provider's website that indicates the way of obtainment, writing stating that the provider has received the consent of the person concerned, consent information or the like. The apparatus (the data management apparatus 101 in this example) of the business operator "C001" having received the personal data generates reception (holding) record information on the personal data, and registers storage information in the storage system 201.

In a case where the business operator of the data management apparatus 101 is the provider business operator, the data management apparatus 101 creates disclosure record information, and registers the information in the storage system 201. The apparatus of the receiver business operator (e.g., the business operator of the data receiver apparatus 401) creates reception record information, and stores the information in the apparatus of the receiver business operator. Alternatively, the apparatus of the receiver business operator may register the record information in the storage system 201. That is, the storage system 201 may be shared between the business operators, and the record information may be registered in the storage system 201 identical between the provider business operator and the receiver business operator. On the other hand, in a case where the business operator of the data management apparatus 101 is the receiver business operator, the data management apparatus 101 creates reception record information, and registers the information in the storage system 201. The apparatus of the provider business operator (e.g., the business operator of the data transmitter apparatus 301) creates disclosure record information, and stores the information in the apparatus of the provider business operator. Alternatively, the apparatus of the provider business operator may register the record information in the storage system 201.

Referring to FIGS. 11 and 12, other specific examples of the record information are described.

FIG. 11 shows attribute information 2, request information 5, and consent information 7, as examples of the attribute information on the personal data, request information, and consent information, respectively. The request information 5 requests use (analysis is herein assumed) of the personal data on the attribute information 2 by a business operator "C001" (retention business operator). The request information 2 satisfies the consent information 7.

The history registrar 14 of the data management apparatus 101 generates analysis record information on the basis of the data analysis result by the data analyzer 17. More specifically, the data analyzer 17 of the data management apparatus 101 (business operator "C001") analyzes the personal data having the attribute information 2, and generates analysis result data. The analysis result data is an example of data (generated data) generated through use of data. The analysis result data (generated data) includes a data main body, and attribute information. The analysis result data is held in the data holding device 11. The history registrar 14 creates record information on use (here, analysis) on the basis of the analysis result data.

At the left of FIG. 12, attribute information 3 is shown as an example of attribute information on the analysis result data (generated data). At the right of FIG. 12, an example of analysis record information is shown. The analysis record information includes a record identifier, a record type ("GENERATION" in this example), a record business operator (analysis business operator) having performed recording in the storage system 201, a consent information identifier, information identifying one or more used data items (a use data owner identifier, use data type, use data details, etc.; in this example, information on the attribute information 2), and information identifying the generated data (generated data owner identifier, generated data type, generated data details, date and time when the generated data was generated). The information identifying the generated data corresponds to the attribute information 3 in this example.

Referring to FIG. 13, other specific examples of the record information are described.

FIG. 13 shows attribute information 1, request information 3, and consent information 3, as examples of the attribute information on the personal data, request information, and consent information, respectively. The request information 3 requests obtainment of the personal data on the attribute information 2 by the business operator "C001" from the person. The request information 2 satisfies the consent information 3.

The history registrar 14 of the data management apparatus 101 generates the obtainment record information on the basis of obtainment of the personal data.

FIG. 14 shows an example of obtainment record information. The obtainment record information includes the record identifier, record type, record business operator (obtainer business operator), consent information, information identifying the obtained data (information on the attribute information 1 in this example), and obtainment date and time.

As for the same items as those of consent information to which the record information refers among the items included in the record information, the values of the items may be omitted owing to reference to the consent information.

Figure 15:
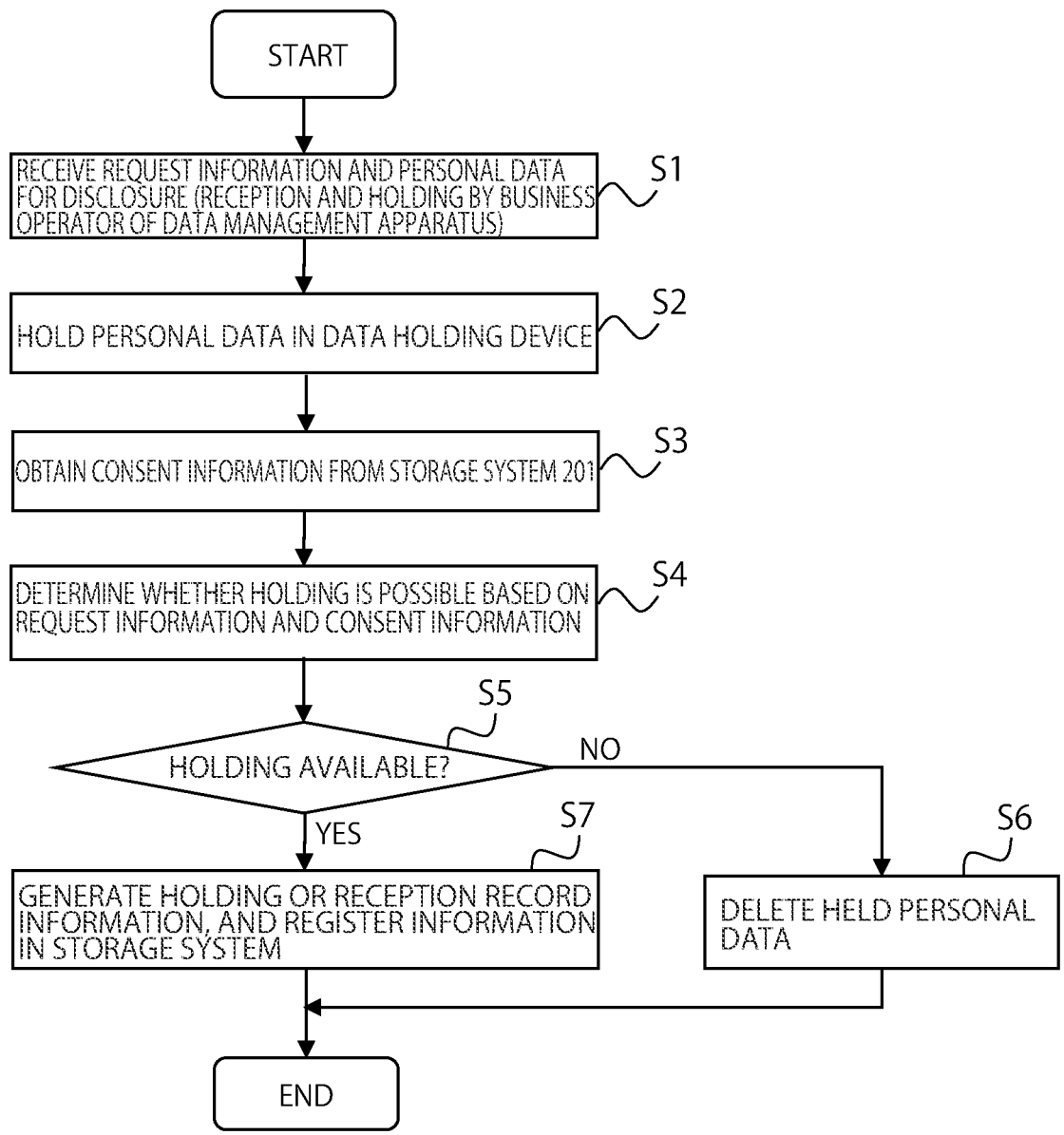
FIG. 15 is a flowchart showing an example of an operation in a case where a data management apparatus receives request information for providing (receiving and holding) personal data.

FIG. 15 is a flowchart showing an example of an operation in a case where the data management apparatus 101 receives request information for providing the personal data. The request information requests that the personal data is provided to the data management apparatus 101 (reception and holding of the personal data by the data management apparatus 101). Note that the personal data means a set of one or more personal data items.

The input device 15 receives request information for holding the personal data, and the personal data to be held (step S1). The input device 15 transmits the request information to the determination processor 13, and transmits the personal data to the data holding device 11. The data holding device 11 receives the personal data, and stores the personal data in the internal storage (step S2). The determination processor 13 receives the request information, and transmits the request information to the consent information obtainer 12. The consent information obtainer 12 requests the storage system 201 to read the consent information, and receives the consent information from the storage system 201 (step S3). The consent information obtainer 12 transmits the consent information to the determination processor 13, and the determination processor 13 determines whether the holding is possible on the basis of the consent information and the request information (step S4). The determination processor 13 transmits the determination result to the data holding device 11. If the determination result indicates the holding is not possible (NO in step S5), the data holding device 11 deletes the personal data (step S6). The data holding device 11 may transmit a notification that the holding is not possible for the data transmitter apparatus 301 via the output device 16. If the determination result indicates that the holding is possible (YES in step S5), the data holding device 11 causes the content of the process to be "RECEPTION" (or holding or the like, in some cases), and transmits the attribute information on the personal data and the information indicating the content of the process to the history registrar 14. The history registrar 14 receives the attribute information on the personal data and information indicating the content of the process, and generates reception (or holding) record information (step S7). The history registrar 14 requests the storage system 201 to register the record information, and the storage system 201 stores storage record information (the same step S7).

Figure 16:
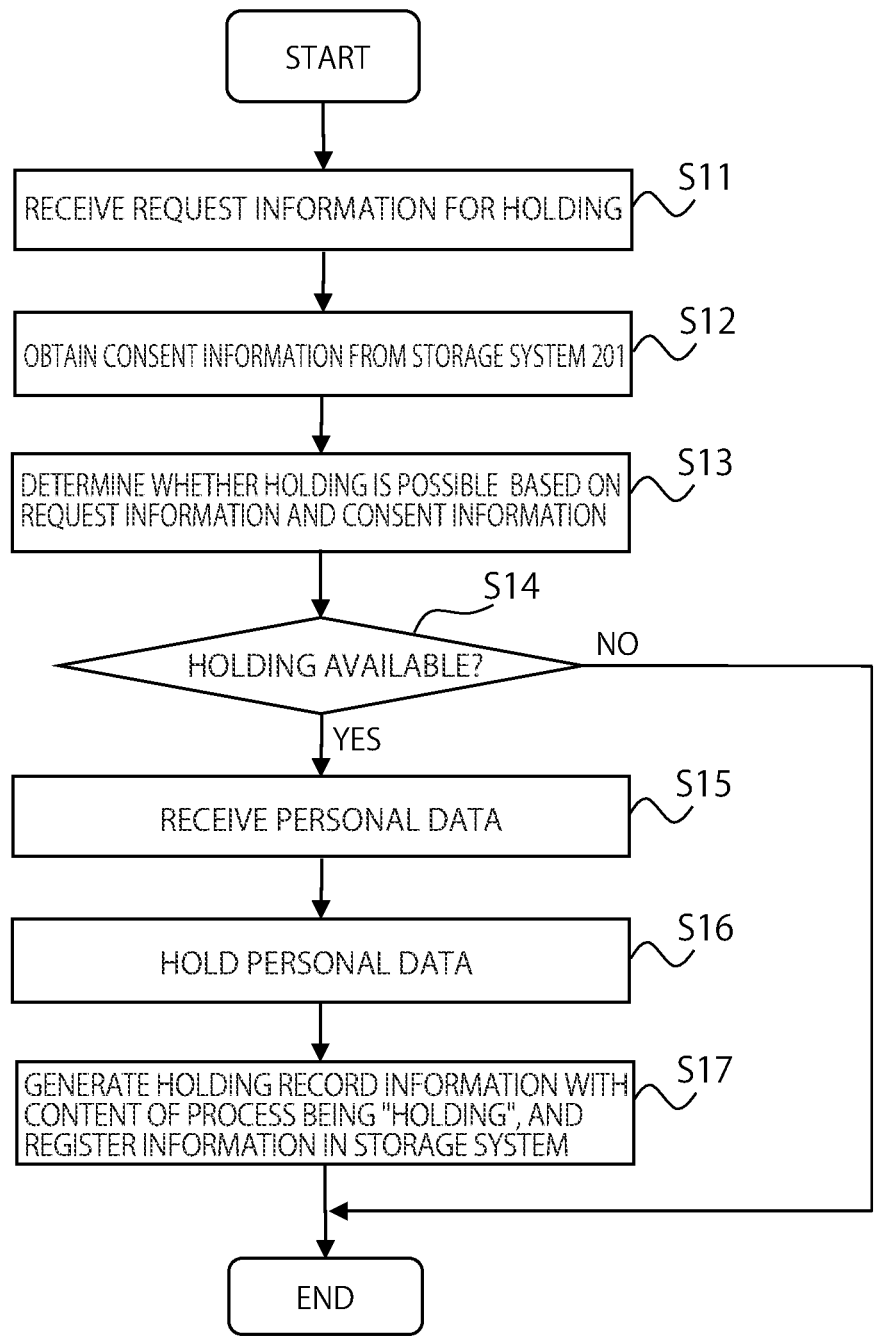
FIG. 16 is a flowchart showing another example of an operation in a case where the data management apparatus receives request information for providing (receiving and holding) the personal data.

FIG. 16 is a flowchart showing another example of an operation in a case where the data management apparatus 101 receives request information for providing the personal data. This example is characterized in that the holding is determined to be possible, and subsequently the personal data to be held is received. The other operations are basically the same as those in FIG. 15.

The input device 15 receives request information for holding the personal data (step S11). The input device 15 transmits the request information to the determination processor 13. The determination processor 13 receives the request information, and transmits the request information to the consent information obtainer 12. The consent information obtainer 12 requests the storage system 201 to read the consent information, on the basis of the request information, and receives the consent information from the storage system 201 (step S12). The consent information obtainer 12 transmits the consent information to the determination processor 13, and the determination processor 13 determines whether the holding is possible on the basis of the consent information and the request information (step S13). The determination processor 13 transmits the determination result to the data holding device 11. If the determination result indicates the holding is possible (YES in step S14), the data holding device 11 receives the personal data for which the holding is possible, from the data transmitter apparatus 301 via the input device 15 (step S15). The data holding device 11 internally stores the received personal data (step S16). The data holding device 11 causes the information indicating the content of the process to be "RECEPTION" (or holding or the like, in some cases), and transmits the attribute information on the personal data, and the information indicating the content of the process, to the history registrar 14. The history registrar 14 receives information that indicates the attribute information on the personal data and the content of the process, and generates holding record information (step S17). The history registrar 14 requests the storage system 201 to register the record information, and the storage system 201 stores reception (or holding) record information (the same step S17). If the determination result indicates the holding is not possible (NO in step S14), the data holding device 11 may transmit a notification that the holding is not possible for the data transmitter apparatus 301 via the output device 16.

Figure 17:
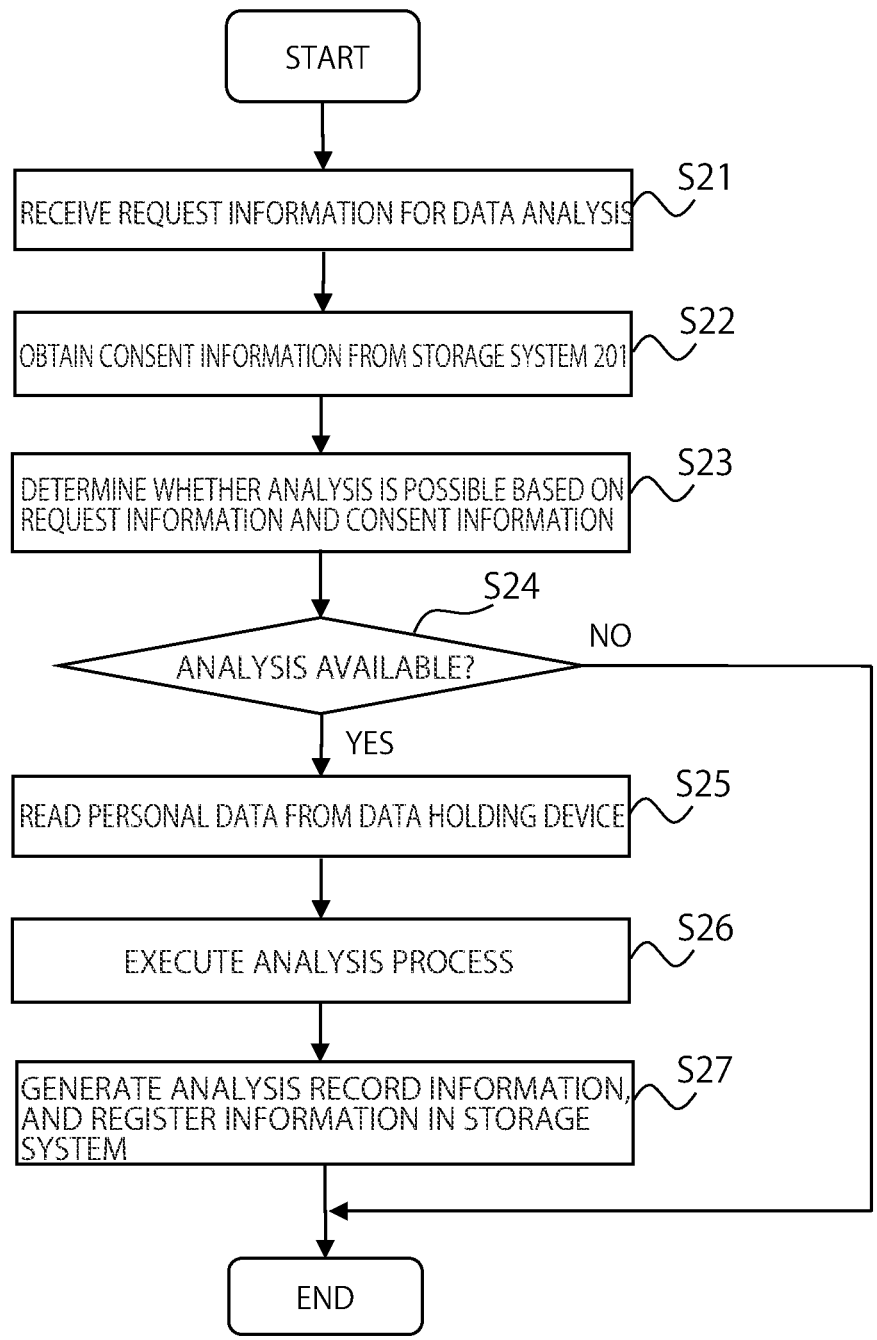
FIG. 17 is a flowchart showing an example of an operation in a case where the data management apparatus receives request information for using the data.

FIG. 17 is a flowchart showing an example of an operation in a case where the data management apparatus 101 receives request information for use (here, data analysis) of the data. The input device 15 receives request information for data analysis, and transmits the request information for data analysis to the determination processor 13 (step S21). The determination processor 13 receives the request information for data analysis, and transmits the request information to the consent information obtainer 12. The consent information obtainer 12 requests the storage system 201 to read the consent information, on the basis of the request information, and receives the consent information from the storage system 201 (step S22). The consent information obtainer 12 transmits the consent information to the determination processor 13, and the determination processor 13 determines whether the analysis is possible on the basis of the consent information and the request information (step S23). The determination processor 13 transmits the determination result to the data holding device 11 (step S24). If the determination result indicates that the analysis is possible (YES in step S24), the data analyzer 17 reads the personal data from the data holding device 11, executes a predetermined analysis process, and generates analysis result data (step S25). The data analyzer 17 transmits the analysis result data to the data holding device 11, and the data holding device 11 stores the analysis result data in the internal storage (step S26). Note that the analysis result data includes a data main body, and attribute information. The data holding device 11 transmits the attribute information on the personal data used for analysis, and the attribute information on the analysis result data, to the history registrar 14. The history registrar 14 receives the attribute information on the personal data used for analysis, and the attribute information on the analysis result data, generates analysis record information, and requests the storage system 201 to register the analysis record information (step S27). The storage system 201 stores the analysis record information (the same step S27). If the determination result indicates the analysis is not possible (NO in step S24), the data holding device 11 may transmit a notification that the analysis is not possible, to the data transmitter apparatus 301 via the output device 16.

Figure 18:
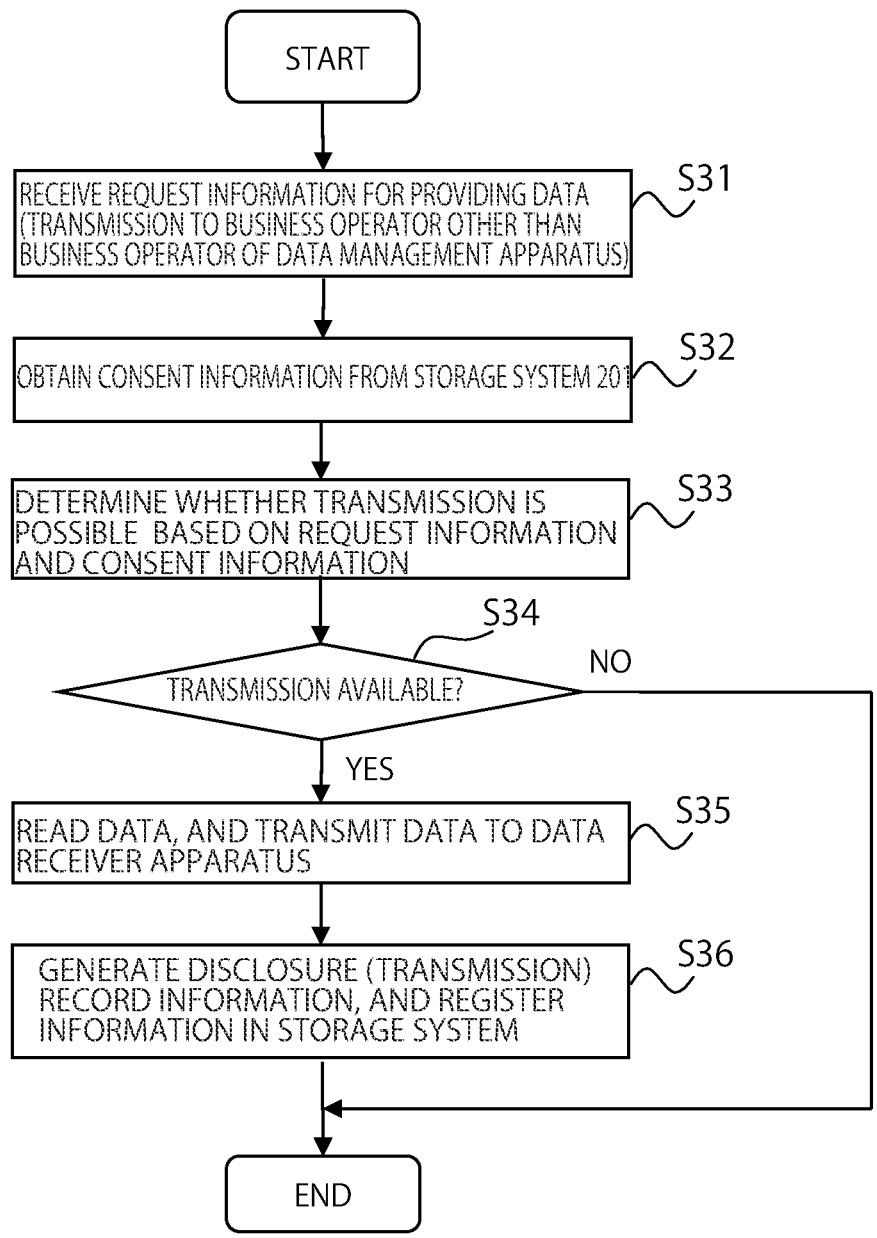
FIG. 18 is a flowchart showing an example of an operation in a case where the data management apparatus receives request information for providing (transmitting) data for another business operator.

FIG. 18 is a flowchart showing an example of an operation in a case where the data management apparatus 101 receives request information for providing (transmitting) data for another business operator. The input device 15 receives disclosure request information, and transmits the disclosure request information to the determination processor 13 (step S31). The determination processor 13 receives the disclosure request information, and transmits the request information to the consent information obtainer 12. The consent information obtainer 12 requests the storage system 201 to read the consent information, on the basis of the request information, and receives the consent information from the storage system 201 (step S32). The consent information obtainer 12 transmits the consent information to the determination processor 13. The determination processor 13 determines whether data transmission is possible (whether disclosure is possible) on the basis of the consent information and the request information, and transmits the determination result to the data holding device 11 (step S33). If the determination result indicates that the transmission is possible (YES in step S34), the data holding device 11 transmits the corresponding data (the personal data, the analysis result data or the like) to the data receiver apparatus 401 via the output device 16 (step S35). The data holding device 11 transmits the attribute information on the transmitted data, and the information indicating the content of the process, to the history registrar 14. The history registrar 14 receives the attribute information on the data, and the information indicating the content of the process, generates disclosure (transmission) record information, and requests the storage system 201 to register the record information (step S36). The storage system 201 stores the disclosure record information (the same step S36). If the determination result indicates the transmission is not possible (NO in step S24), the data holding device 11 may transmit a notification that the transmission is not possible, to the data transmitter apparatus 301 via the output device 16.

Figure 19:
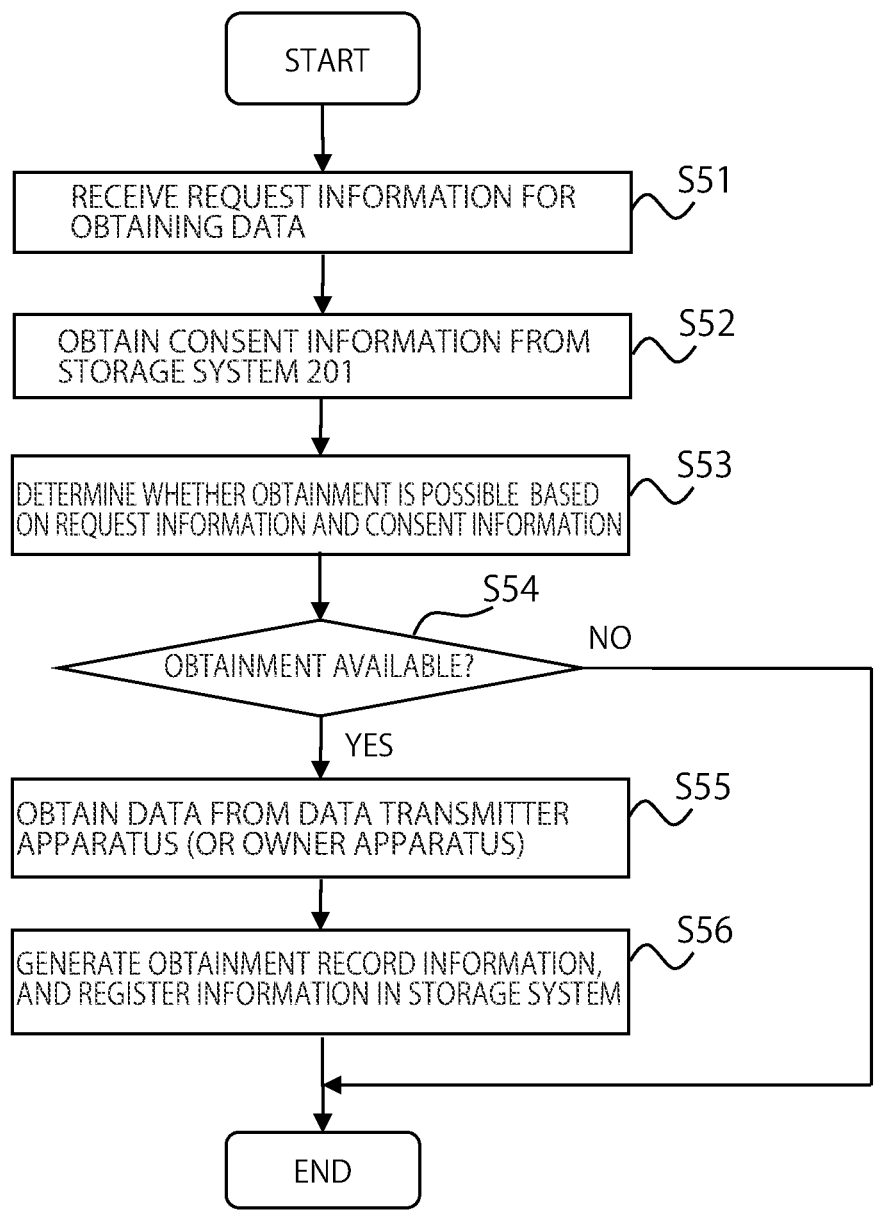
FIG. 19 is a flowchart showing an example of an operation in a case where the data management apparatus receives request information for obtaining data.

FIG. 19 is a flowchart showing an example of an operation in a case where the data management apparatus 101 receives request information for obtaining the data. It is herein assumed that the owner apparatus 501 is identical to the data transmitter apparatus 301. The input device 15 receives obtainment request information (the data management apparatus 101 is assumed as the obtainer business operator) from the data transmitter apparatus 301 (or the owner apparatus 501), and transmits the obtainment request information to the determination processor 13 (step S51). The request information may be issued in the data management apparatus 101. The determination processor 13 receives the obtainment request information, and transmits the request information to the consent information obtainer 12. The consent information obtainer 12 requests the storage system 201 to read the consent information, on the basis of the request information, and receives the consent information from the storage system 201 (step S52). The consent information obtainer 12 transmits the consent information to the determination processor 13. The determination processor 13 determines whether data obtainment is possible on the basis of the consent information and the request information, and transmits the determination result to the data holding device 11 (step S53). If the determination result indicates that the obtainment is possible (YES in step S54), the data holding device 11 obtains the corresponding data (the personal data) from the data transmitter apparatus 301 (or the owner apparatus 501) via the input device 15 (step S55). The data holding device 11 transmits the attribute information on the obtained data, and the information indicating the content of the process, to the history registrar 14. The history registrar 14 receives the attribute information on the data, and the information indicating the content of the process, generates obtainment record information, and requests the storage system 201 to register the record information (step S56). The storage system 201 stores the obtainment record information (the same step S56). If the determination result indicates that the obtainment is not possible (NO in step S54), the data holding device 11 may transmit a notification that obtainment is not possible, to the data transmitter apparatus 301 (or the owner apparatus 501) via the output device 16.

As described above, according to this embodiment, it can be verified at high speed whether the request information about the process of data about the person satisfies the condition (consent condition) of consent by the person or not by obtaining the consent information from the storage system. Consequently, the consent to process the data about the person can be effectively verified. For example, services that utilize data about people require collection of data about people as much as possible. In this embodiment, the consent condition can be set with a fine granularity, such as in units of business operators and units of purposes. Accordingly, presence or absence of consent (whether the consent condition is satisfied or not) can be easily verified for various pieces of request information. Consequently, the data about people can be effectively collected. Use and utilization of data based on consent of a person provides the person with an added value. Accordingly, it is expected to result in collection of more amount of data.

Modified Example 1

The data management apparatus 101 may further include an identifier holding device that holds the identifier of the business operator of the data management apparatus 101. In this case, the determination processor 13 and the data holding device 11 may read, from the identifier holding device, the identifier of the business operator that manages the data management apparatus 101. Alternatively, the identifier of this business operator may be held in the determination processor 13 and the data holding device 11.

Modified Example 2

A rule may be introduced according to which when an item about the business operator is blank in the request information received by the data management apparatus 101, the identifier of the business operator having received the request information is stored therein. For example, when the request information includes at least one item among the obtainer business operator, use business operator, provider business operator and receiver business operator but this item is blank, the identifier of the business operator of the data management apparatus 101 may be stored therein. In this case, the identifier of the business operator may be read from the identifier holding device in the modified example 1.

Modified Example 3

As described above, the storage system 201 may manage the record information and the consent information using a blockchain. The blockchain may be managed only by the business operator of the data management apparatus 101. Some of the nodes (computers and servers) that manage a blockchain are managed by the business operator of the data management apparatus 101. Some of the remaining nodes may be managed by what is other than the business operator of the data management apparatus 101, for example, the business operator that manages the data transmitter apparatus 301, or the business operator that manages the data receiver apparatus 401. Part of the consent information storage may be managed, as some of the nodes of the blockchain, by the business operator of the data management apparatus 101.

Figure 20:
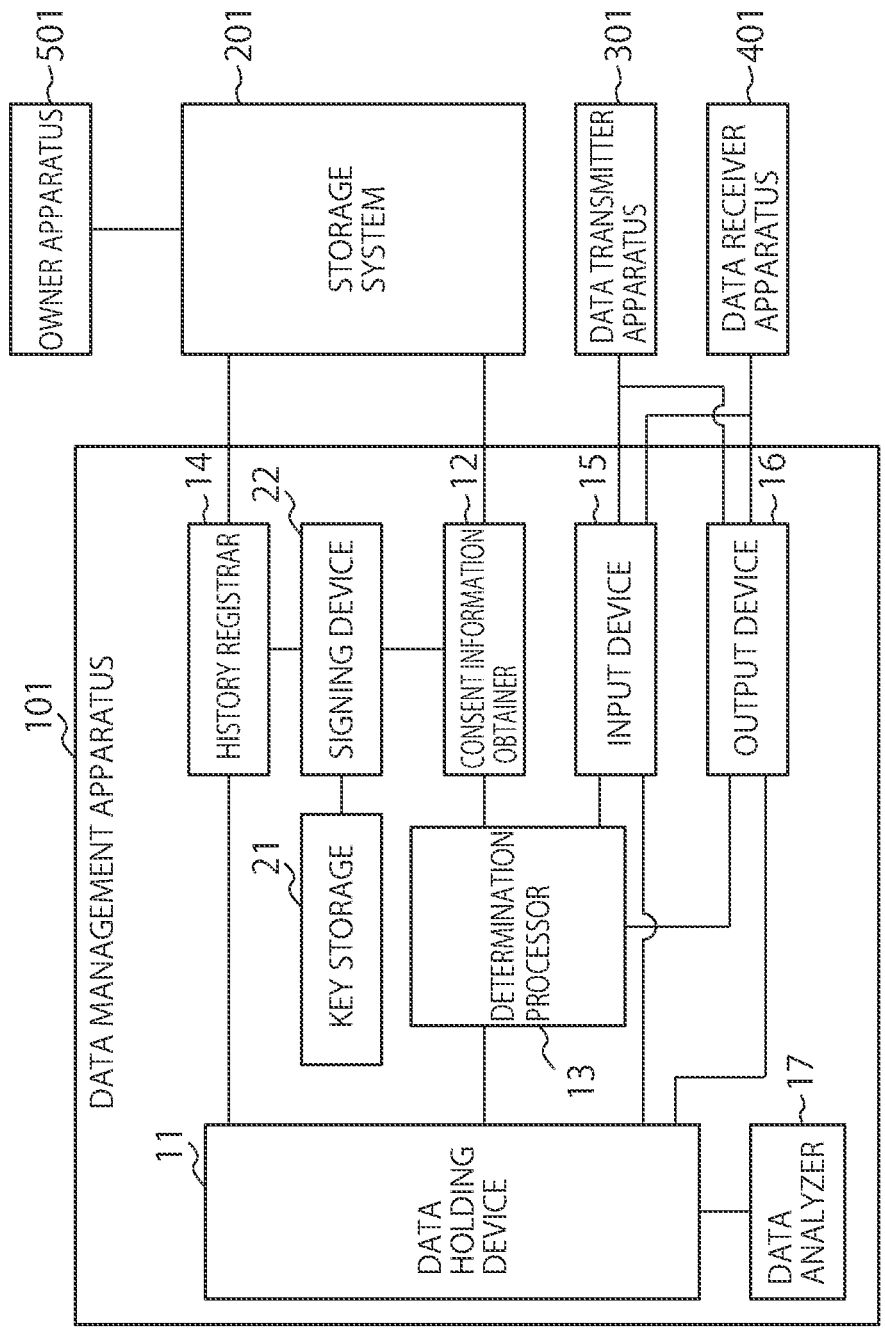
FIG. 20 shows a configuration example of the data management apparatus in a case where a storage system uses a blockchain.

FIG. 20 shows a configuration example of the data management apparatus 101 in a case where the storage system 201 uses a blockchain. The data management apparatus 101 further includes a key storage 21, and a signing device 22. The signing device 22 may be configured by processing circuitry. The history registrar 14 causes the record information to have the form of a transaction of the blockchain, and requests the signing device 22 to sign the transaction. The signing device 22 reads a signature key from the key storage 21, signs the transaction, and transmits the signed transaction to the history registrar 14. The history registrar 14 transmits the signed transaction to the storage system 201. The storage system 201 adds the signed transaction to a block, and adds the block to the blockchain. The consent information may be managed by the same blockchain as that of the record information. In this case, the owner apparatus 501 causes the consent information to have the form of a transaction, signs the transaction using the signature key, and transmits the signed transaction to the storage system 201. The storage system 201 adds the signed transaction to a block, and adds the block to the blockchain.

In the case where the blockchain is used, it may be determined whether the consent information obtained by the data management apparatus is the latest or not on the basis of the order of blocks. Alternatively, the latest consent information may be verified by recording the latest consent information in a region called a state and by reading the information on the state. Hereinafter, the storage system 201 using the blockchain is described with reference to FIG. 21.

Figure 21:
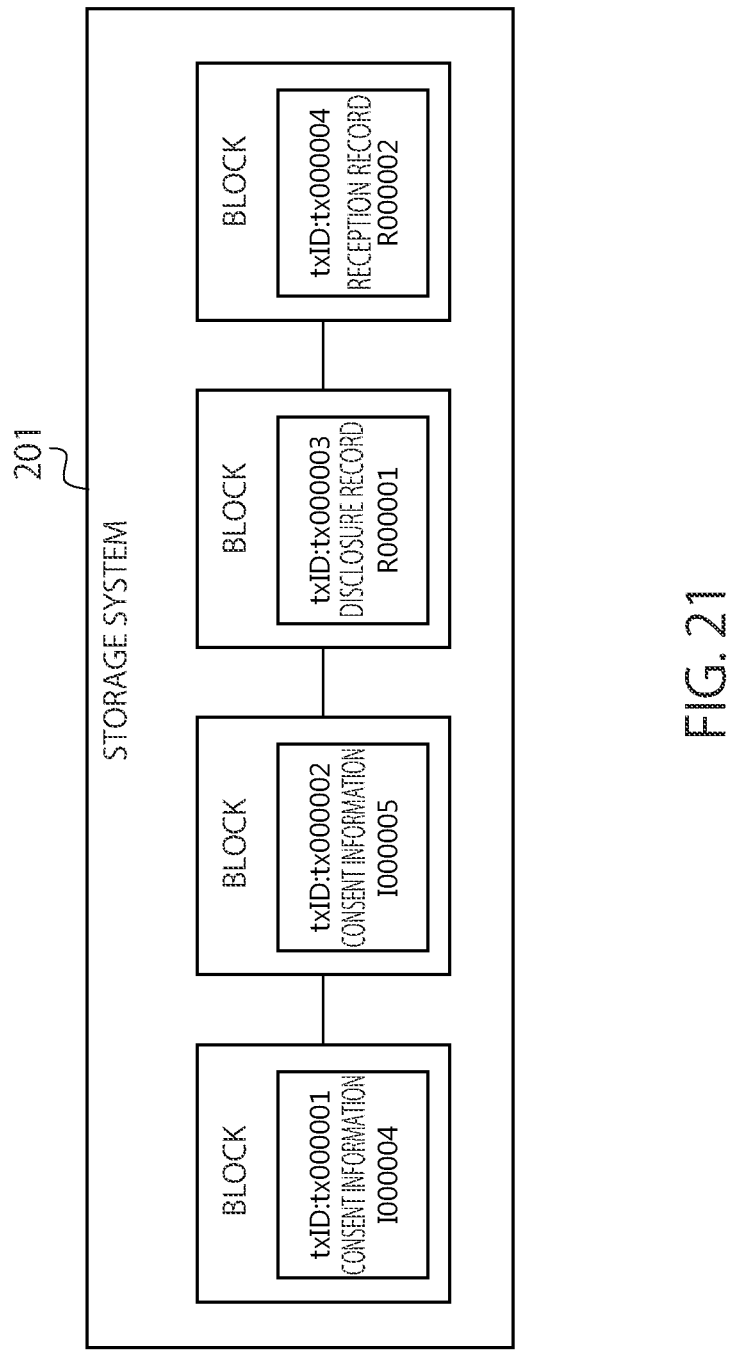
FIG. 21 shows a configuration example of the storage system.

FIG. 21 shows a configuration example of the storage system 201. The storage system 201 records the consent information and the record information in a block of the blockchain. One block includes one or more pieces of consent information and record information as a transaction. When the consent information or the record information is registered, each piece of information (transaction) may be assigned a transaction ID ("txID" in FIG. 21), or the information (consent information or record information) may be referred to based on the transaction ID.

Figure 22:
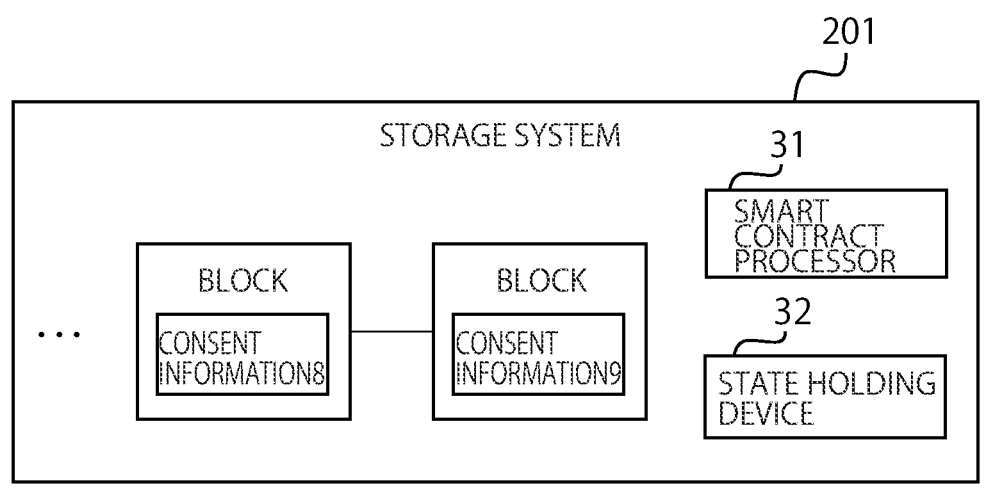
FIG. 22 shows another configuration example of the storage system.

Referring to FIGS. 22, 23 and 24, the storage system 201 using a blockchain according to another scheme is described.

FIG. 22 shows another configuration example of the storage system 201. The storage system 201 includes: a blockchain that includes one or more blocks; a state holding device 31; and a smart contract processor 32. The storage system 201 records, in a block, the consent information or the record information requested to be recorded. One block includes, as a transaction, one or more pieces of at least one of the consent information and the history information. At recording, each piece of information (transaction) transaction ID may be assigned, and the information may be referred to based on the transaction ID.

In this example, a blockchain is shown where multiple blocks that include a block including consent information 8, and a block including consent information 9 are connected to each other. Each block is added to the right along the plane.

FIG. 23 shows examples of the consent information 8 and the consent information 9. Attribute information (attribute information 2 and attribute information 3) on two personal data items on a certain person serving as a target of the consent information 8 and the consent information 9, is shown.

For example, the state holding device 31 records, as a state, part of or the entire current (latest) consent information for each personal data item. The smart contract processor 32 updates the state holding device 31, on the basis of the consent information or the record information requested to be newly registered, and of the current state held in the state holding device.

FIG. 24 shows an update example of states held in the state holding device 31. For example, when the consent information 8 is written in a block, the state holding device 31 is updated to a state 1. Subsequently, when the consent information 9 is written in a block, the state 1 is updated to a state 2.

Modified Example 4

The smart contract processor 32 of the storage system 201 in FIG. 22 may perform a determination process. Description is made with reference to FIG. 25.

Figure 25:
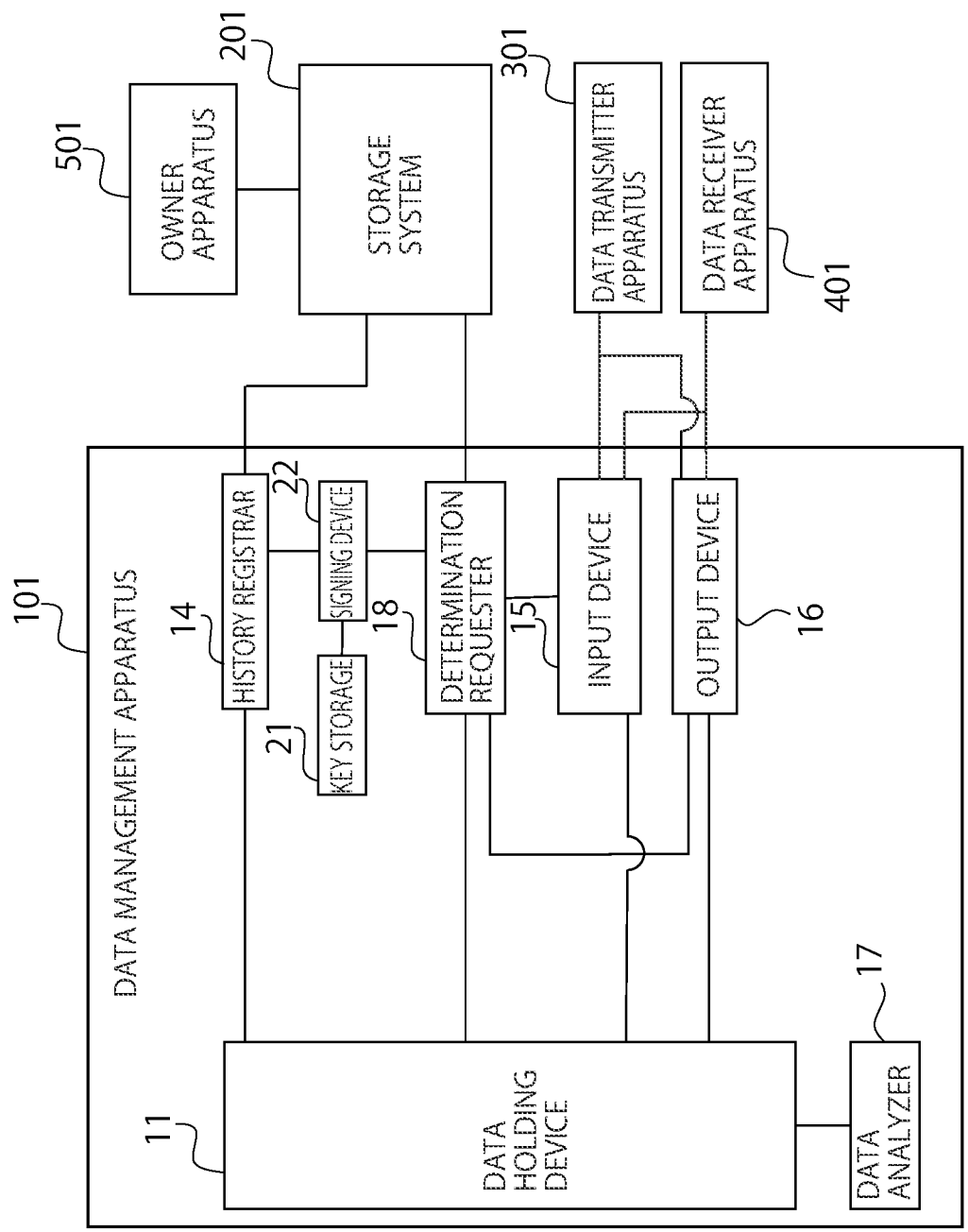
FIG. 25 is an overall configuration diagram of a data management system according to a modified example 4.

FIG. 25 is an overall configuration diagram of a data management system according to a modified example 4.

The input device 15 receives request information, and transmits the request information to the determination requester 18. The determination requester 18 may be configured by processing circuitry as one example. The determination requester 18 causes the request information to have the form of a transaction, and transmits the information to the storage system 201. The smart contract processor 32 of the storage system 201 performs a determination process similar to that of the determination processor 13 in the first embodiment, on the basis of the received request information and of the consent information read from the state holding device 31. The storage system 201 transmits the determination result to the determination requester 18. The determination requester 18 transmits the determination result to the data holding device 11.

As described above, according to the modified examples 3 and 4, use of the blockchain can improve resistance to falsification of the consent information and records.

Second Embodiment

Figure 26:
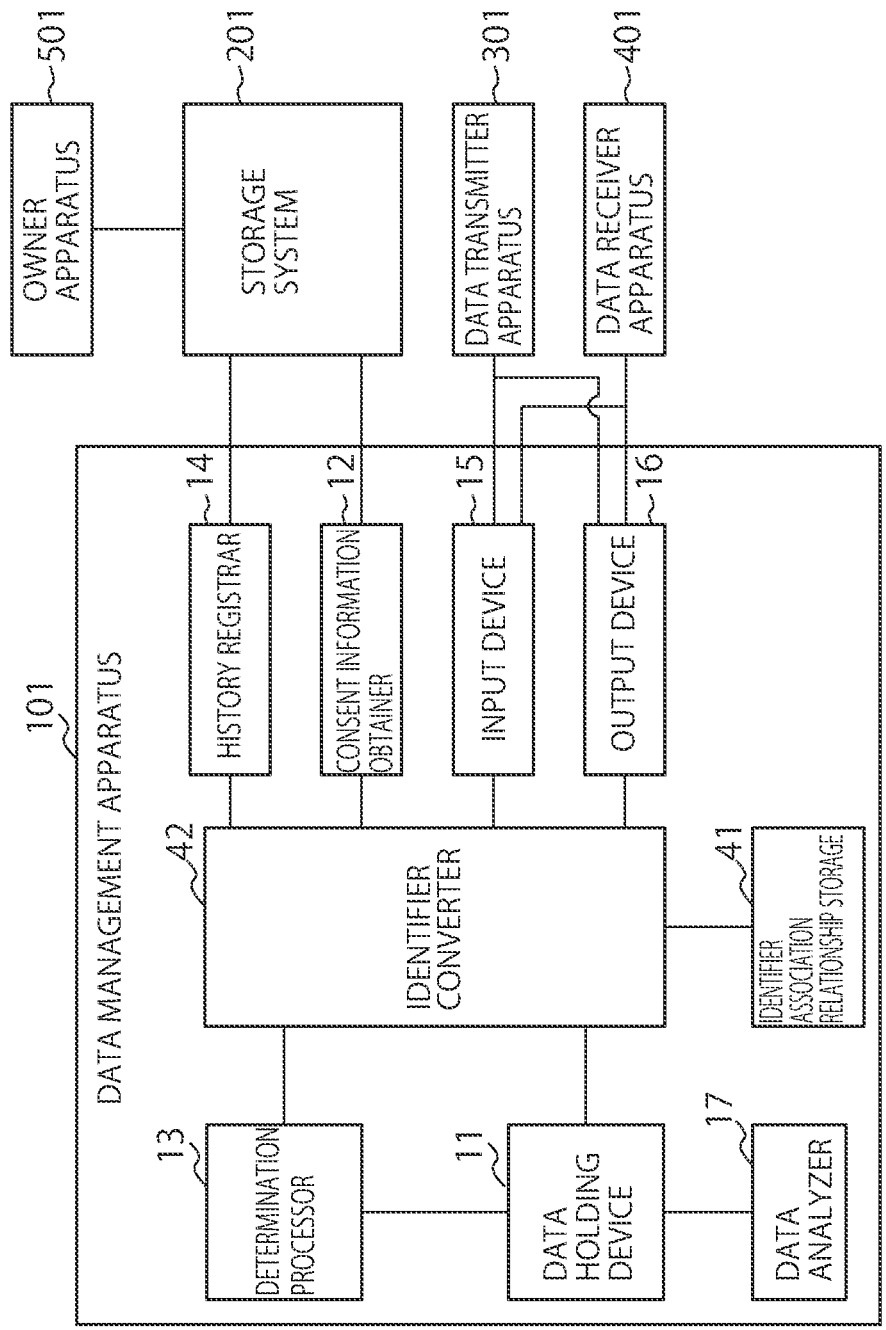
FIG. 26 is an overall configuration diagram of a data management system according to a second embodiment.

FIG. 26 is an overall configuration diagram of a data management system according to a second embodiment. The data management apparatus 101 further includes an identifier association relationship storage 41, and an identifier converter 42.

In the second embodiment, for a certain identical data holding device (person), the data management apparatus 101, the storage system 201, the data transmitter apparatus 301, and the data receiver apparatus 401 use owner identifiers different from each other.

The identifier association relationship storage 41 stores an association table between the owner identifiers of the apparatuses (101, 201, 301 and 401). The association table is stored by the administrator or the like of the data management apparatus 101.

FIG. 27 shows an example of the association table. For example, an owner identifier 1 is an identifier used for managing (identifying) the owner in the storage system 201. An owner identifier 2 is an identifier used for managing the owner in the data management apparatus 101. An owner identifier 3 is an identifier used for managing the owner in the data transmitter apparatus 301. An owner identifier 4 is an identifier used for managing the owner in the data receiver apparatus 401. In a case where the owner identifiers are common to multiple apparatuses, the association table may be an association table of owner identifiers of two or three types instead of four types. For example, the association table may be that of the owner identifier 2 and the owner identifier 3. An association table may be generated by associating the preliminarily obtained owner identifier with the newly obtained owner identifier.

The identifier converter 42 receives information including the owner identifier to be converted (convert target information), and information on an output destination (output destination information) about information including the converted owner identifier. The identifier converter 42 obtains the corresponding owner identifier "j" (j=1, . . . , 4, j≠i), from the owner identifiers "i" (i=1, . . . , 4) included in the convert target information, on the basis of the association table. The identifier converter 42 generates, as converted information, information where the owner identifier "i" of the convert target information is replaced with an owner identifier "j". The owner identifier "i" included in the convert target information is thus converted into the owner identifier "j". The identifier converter 42 outputs the converted information that includes the converted owner identifier "j", to the output destination indicated by the output destination information.

The operation of the data management apparatus 101 in the second embodiment is different from that in the first embodiment in that a process of converting the owner identifier by the identifier converter 42 upon occurrence of exchange between the apparatuses dealing with different owner identifiers is added. In a case where the owner identifier is common to some of the apparatuses, the process of converting the owner identifier by the identifier converter 42 is not required for the exchange between the apparatuses having the common owner identifier.

Figure 28:
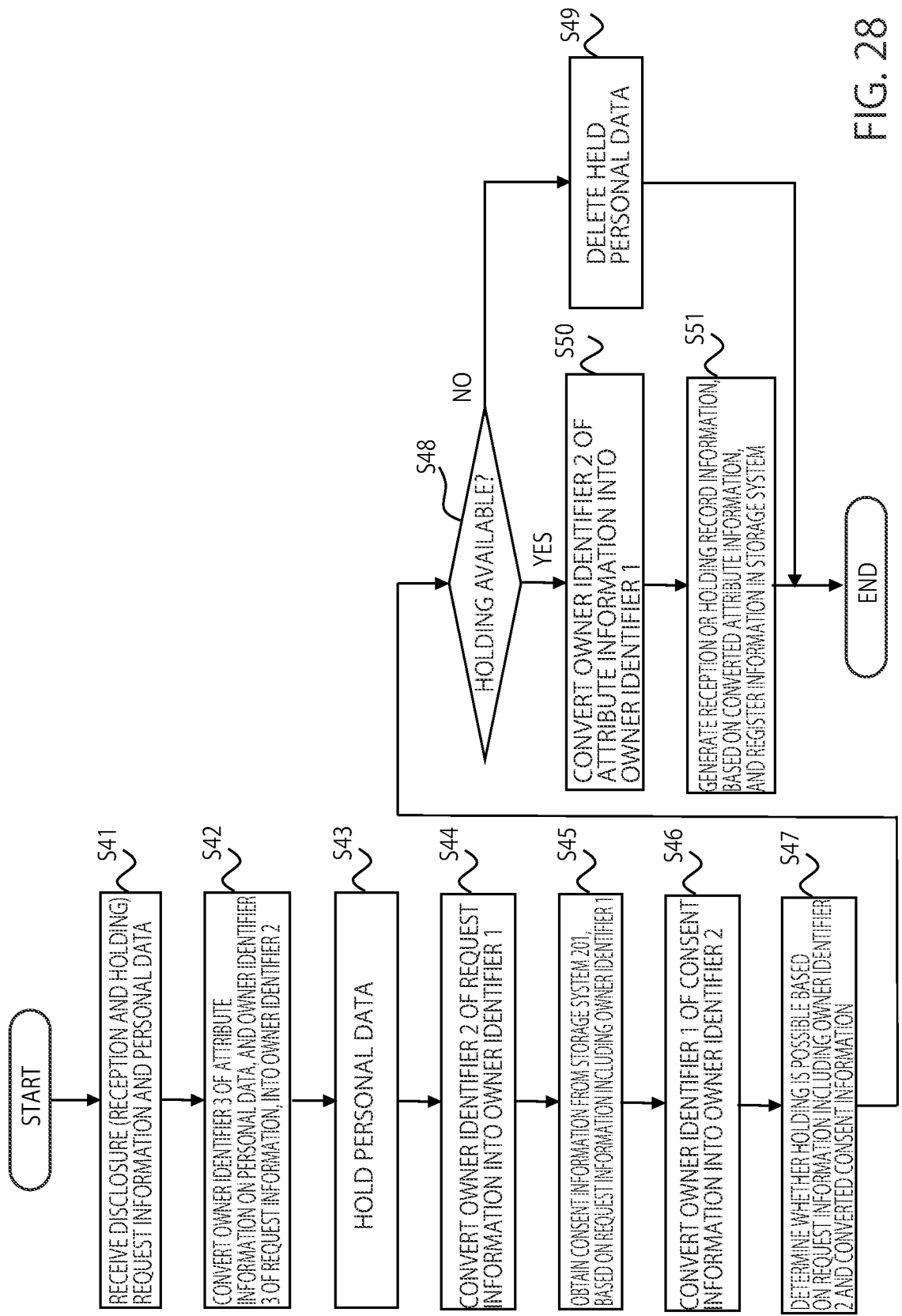
FIG. 28 shows an example of an operation in a case where the data management apparatus receives request information for providing the personal data.

FIG. 28 shows an example of an operation in a case where the data management apparatus 101 receives request information for providing the personal data, as an example of the operation using the identifier converter 42. The request information requests the data management apparatus 101 to provide the personal data (reception and holding of the personal data by the data management apparatus 101).

The input device 15 receives request information for holding the personal data, and the personal data to be held (step S41). The input device 15 transmits the request information and the personal data to the identifier converter 42. The identifier converter 42 converts the owner identifier 3 of the attribute information on the received personal data into the owner identifier 2, and transmits the converted personal data to the data holding device 11 (step S42). The identifier converter 42 converts the owner identifier 3 of the attribute information on the received request information into the owner identifier 2, and transmits the converted request information to the determination processor 13 (the same step S42). The data holding device 11 receives the converted personal data, and stores the personal data in the internal storage (step S43).

The determination processor 13 transmits the received request information and a consent reading request to the identifier converter 42. The identifier converter 42 converts the owner identifier 2 of the attribute information on the received request information into the owner identifier 1, and transmits the converted request information to the consent information obtainer 12 (step S44). The consent information obtainer 12 requests the storage system 201 to read the consent information, on the basis of the converted request information, and receives the consent information from the storage system 201 (step S45). The consent information obtainer 12 transmits the consent information to the identifier converter 42. The identifier converter 42 converts the owner identifier 1 of the received consent information into the owner identifier 2, and transmits the converted consent information to the determination processor 13 (step S46).

The determination processor 13 determines whether the holding is possible on the basis of the converted consent information and the converted request information received from the identifier converter 42 (step S47). The determination processor 13 transmits the determination result to the data holding device 11. If the determination result indicates that the holding is not possible (NO in step S48), the data holding device 11 deletes the personal data (step S49). The data holding device 11 may transmit a notification that the holding is not possible to the data transmitter apparatus 301 via the identifier converter 42 and the output device 16 wherein the in the identifier converter 42, the owner identifier 2 is converted to the owner identifier 3. If the determination result indicates that the holding is possible (YES in step S48), the data holding device 11 transmits information indicating the content of the process to the history registrar 14, and transmits the attribute information on the personal data to the identifier converter 42. The identifier converter 42 converts the owner identifier 2 of the received attribute information into the owner identifier 1, and transmits the converted attribute information to the history registrar 14 (step S50). The history registrar 14 receives the converted attribute information and information indicating the content of the process, and generates reception (or holding) record information (step S51). The history registrar 14 requests the storage system 201 to register the record information, and the storage system 201 stores reception (or holding) record information (the same step S51).

Even when the request information for use (analysis or the like), the obtainment request information or the like is received, operations similar to those of the first embodiment can be achieved by performing an operation converting the owner identifier using the identifier converter.

As described above, according to this embodiment, even when owner identifiers different among the systems or apparatuses are used, consent can be verified and recorded.

Modified Example 1

The owner identifier (owner identifier 2) used in the data holding device 11 may be a pseudonym. Pseudonyms are, for example, character strings which are random and do not overlap each other. The person cannot be identified only with the pseudonym. However, through use of the association table, the person can be identified.

FIG. 29 shows an example of an association table where the owner identifier 2 is a pseudonym. Owner identifiers other than the owner identifier 2 may be pseudonyms. Multiple identifiers among the owner identifiers 1 to 4 may be pseudonyms.

As described above, according to this modified example, data can be stored with the pseudonym, and the privacy of people can be protected.

(Hardware Configuration)

Figure 30:
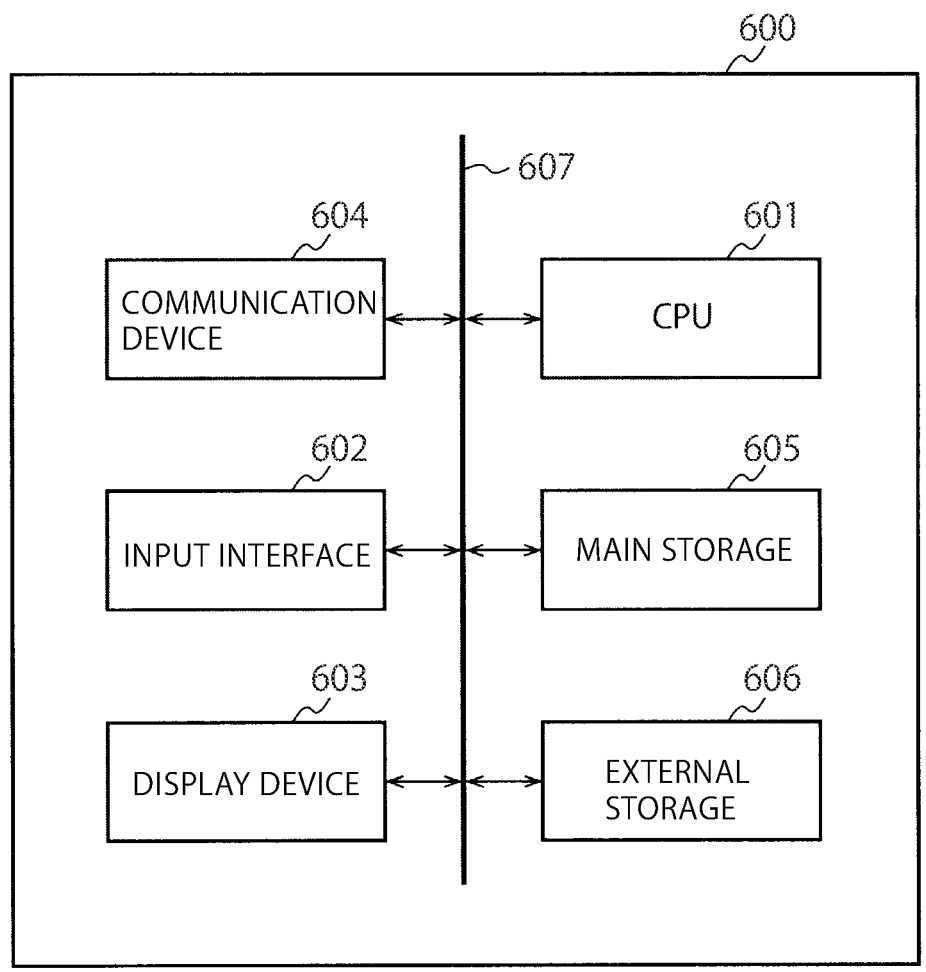
FIG. 30 shows a hardware configuration of the data management apparatus which is information processing apparatus.

FIG. 30 illustrates a hardware configuration of the data management device (information processing apparatus) 101 according to the present embodiment. The information processing apparatus 101 according to the present embodiment is constructed of a computer apparatus 600. The computer apparatus 600 is provided with a CPU 601, an input interface 602, a display device 603, a communication device 604, a main storage 605 and an external storage device 606, which are mutually connected by a bus 607.

The CPU (central processing unit) 601 executes a computer program for implementing the above-mentioned respective functional components of the information processing apparatus 101 on the main storage 605. The CPU 601 executes the computer program and thereby implements the respective functional components.

The input interface 602 is a circuit for inputting operation signals from the input device such as a keyboard, mouse, and touch panel or the like into the data management device 101.

The display device 603 displays data or information outputted from the data management apparatus 101. The display device 603 is, for example, an LCD (Liquid Crystal Display), a CRT (Cathode Ray Tube), and a PDP (plasma display), but the display device 603 is not limited thereto. The data or information outputted from computer apparatus 600 can be displayed by this display device 603.

The communication device 604 is a circuit for the information processing apparatus 101 to communicate with the external device by wireless or wired means. Information can be inputted from the external device via the communication device 604. The information inputted from the external device can be stored in the DB, the main storage 605, or the external storage device 606. The communication device 604 corresponds to transmission and reception function provided by the input device 15, the output device 16, the history registrar 14 or the consent information acquirer 12.

The main storage 605 stores a program that implements processing of the present embodiment, data necessary to execute the program and data generated by executing the program. The program is developed and executed on the main storage 605. The main storage 605 may be, for example, RAM, DRAM or SRAM, but it is not limited to this. The various DBs and the storage in each embodiment may be constructed on the main storage 605. The storage or the DB of the data management apparatus 101 may be constructed on the main storage 605.

The external storage device 606 stores the above-described program and data necessary to execute the program, data generated by executing the program or the like. The program and data are read into the main storage 605 during processing of the present embodiment. The external storage device 606 is, for example, a hard disk, an optical disk, a flash memory or a magnetic tape, but it is not limited to this. The various DBs and the storage in each embodiment may be constructed on the external storage device 606.

Note that the above-described program may be preinstalled in the computer apparatus 600 or may be stored in a storage medium such as a CD-ROM. The program may be uploaded on the Internet.

Note that the computer apparatus 600 may be provided with one or a plurality of processors 601, input interfaces 602, display devices 603, communication devices 604 and main storages 605, and peripheral devices such as a printer and a scanner may be connected thereto.

In addition, the data management device 101 may be constructed of the single computer apparatus 600 or may be configured as a system composed of a plurality of mutually connected computer apparatuses 600.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data management method performed by a computer, comprising:
receiving first request information for requesting to execute a process on first data, the first data being data regarding a person, the first request information including an owner identifier identifying an owner of the first data;
acquiring first consent information including an owner identifier matching the owner identifier included in the first request information from a first storage system which stores a plurality of consent information each including a condition under which an owner of data agrees to perform processing on the data, an owner identifier identifying the owner, and a consent information identifier identifying the consent information; and
determining whether the process is executable, based on the first request information and the condition included in the first consent information,
wherein when the first request information satisfies the condition included in the first consent information, the process is permitted to be executed;
generating record information including content of the process permitted to be executed, attribute information on the first data and the consent information identifier included in the first consent information used for determining the process is executable, when the process is performed according to a determination result of whether the process is executable; and providing the record information for a second storage system configured to store the record information.

2. The data management method according to claim 1, wherein when the first request information satisfies the condition included in the first consent information only on part of the first data, the process is permitted to be executed only for the part of the first data.

3. The data management method according to claim 1, wherein the condition in the first consent information includes at least a condition on a business operator that provides the first data through the process from among:
a condition on attribute information on the first data,
a condition on a purpose of the process,
a condition on a business operator that provides the first data through the process,
a condition on a business operator that receives or obtains the first data through the process,
a condition on a business operator that generates another data from the first data based on the process, and
a condition on a limitation on a time period for performing the process.

4. The data management method according to claim 3, wherein the condition in the first consent information includes a plurality of the conditions, and
when all the conditions are satisfied, the process is permitted to be executed.

5. The data management method according to claim 1, wherein when a plurality of the first consent information are present, whether the process is executable on the first data is determined, based on latest first consent information of the plurality of first the consent information.

6. The data management method according to claim 5, further comprising:
checking whether withdrawal information on withdrawal of the first consent information is included in the first consent information; and not permitting the process to be executed when the withdrawal information is included in the latest first consent information.

7. The data management method according to claim 1, wherein the process includes at least one of:
a process of providing the first data from a computer of a first business operator to a computer of a second business operator, the computer of the first business operator executing the data management method;
a process of providing the first data from the computer of the second business operator to the computer of the first business operator;
a process of generating second data based on the first data; and
a process of obtaining the first data.

8. The data management method according to claim 3, wherein the process requested by the first request information is a process of providing the first data from a computer of a second business operator to a computer of a first business operator, the computer of the first business operator executing the data management method through the computer, and
the computer of the first business operator receives the first data by executing the process after the first condition is satisfied.

9. The data management method according to claim 7, wherein the first business operator is a business operator identical to a business operator that is an originator of the first request information.

10. The data management method according to claim 7, wherein the first business operator is a business operator different from a business operator that is an originator of the first request information.

11. The data management method according to claim 1, wherein the consent information in the first storage system is stored by a blockchain.

12. The data management method according to claim 1, wherein the record information is stored by a blockchain in the storage system.

13. The data management method according to claim 1, wherein the person is managed by a first identifier being the owner identifier in the computer,
the person is managed by a second identifier being the owner identifier in the first storage system,
the first request information includes the first identifier,
the second identifier associated with the first identifier is identified based on an association table that associates the first identifier with the second identifier, and
the first consent information is obtained from the first storage system, based on the identified second identifier.

14. The data management method according to claim 8, wherein the record information further includes information on way of obtainment of the first data, which indicates how the second business operator has obtained the first data.

15. A non-transitory computer readable medium having a computer program stored therein which when the computer program is executed by a computer, causes the computer to perform processes, comprising:
receiving first request information for requesting to execute a process on first data, the first data being data regarding a person, the first request information including an owner identifier identifying an owner of the first data;
acquiring first consent information including an owner identifier matching the owner identifier included in the first request information from a first storage system which stores a plurality of consent information each including a condition under which an owner of data agrees to perform processing on the data, an owner identifier identifying the owner, and a consent information identifier identifying the consent information;
determining whether the process is executable, based on the first request information and the condition included in the first consent information, wherein when the first request information satisfies the condition included in the first consent information, the process is permitted to be executed;
generating record information including content of the process permitted to be executed, attribute information on the first data, and the consent information identifier included in the first consent information used for determining the process is executable, when the process is performed according to a determination result of whether the process is executable; and
providing the record information for a second storage system configured to store the record information.

16. A data management system, comprising:
a receiving circuitry which receives first request information to request for executing a process on first data, the first data being data regarding a person the first request information including an owner identifier identifying an owner of the first data;
a determination circuitry which acquires first consent information including an owner identifier matching the owner identifier included in the first request information from a first storage system which stores a plurality of consent information each including a condition under which an owner of data agrees to perform processing on the data, an owner identifier identifying the owner, and a consent information identifier identifying the consent information, and which determines whether the process is executable, based on the first request information and the condition included in the first consent information, wherein when the first request information satisfies the condition included in the first consent information, the process is permitted to be executed;

hardware storage configured to store the first consent information; and a history registrar circuitry which generates record information including content of the process permitted to be executed, attribute information on the first data and the consent information identifier included in the consent information used for determining the process is executable, when the process is performed according to a determination result of whether the process is executable, and which sends the record information to the hardware storage.

17. A data management system, comprising:

a receiving circuitry which receives first request information for requesting to execute a process on first data, the first data being data regarding a person, the first request information including an owner identifier identifying an owner of the first data;

a determination requester circuitry which generates a request for determining whether the process in the first request information is executable based on the first request information, and transmit the request;

a storage system configured to:
  hold a plurality of consent information each including a condition under which an owner of data agrees to perform processing on the data, an owner identifier identifying the owner, and a consent information identifier identifying the consent information,
  receive the request for determining whether the process is executable for the first data, and
  determine whether the process is executable, based on the first request information and the condition included in the first consent information, wherein when the first request information satisfies the condition included in the first consent information, the process is permitted to be executed;

a history registrar circuitry which generates record information including content of the process permitted to be executed, attribute information on the first data and the consent information identifier included in the first consent information, when the process is performed according to a determination result of whether the process is executable, the acquired consent information identifier being included in the record information; and a second storage system which receives the record information from the history registrar circuitry and stores the record information.

\* \* \* \* \*